(12) United States Patent
Lin et al.

(10) Patent No.: US 9,417,438 B2
(45) Date of Patent: Aug. 16, 2016

(54) PHOTOGRAPHING LENS SYSTEM, IMAGE CAPTURING DEVICE AND ELECTRONIC DEVICE

(71) Applicant: LARGAN PRECISION CO., LTD., Taichung (TW)

(72) Inventors: Cheng-Chen Lin, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 14/531,050

(22) Filed: Nov. 3, 2014

(65) Prior Publication Data
US 2016/0091696 A1    Mar. 31, 2016

(30) Foreign Application Priority Data
Sep. 29, 2014    (TW) .............................. 103133785 A

(51) Int. Cl.
*G02B 3/02*      (2006.01)
*G02B 13/18*     (2006.01)
(Continued)

(52) U.S. Cl.
CPC ............ *G02B 13/18* (2013.01); *G02B 13/0045* (2013.01); *H04N 5/2254* (2013.01); *H04N 5/374* (2013.01)

(58) Field of Classification Search
CPC ...... G02B 13/18; G02B 9/60; G02B 13/0045; G02B 13/06; G02B 13/16
USPC ......................................... 359/714, 763–764
See application file for complete search history.

(56) References Cited

U.S. PATENT DOCUMENTS

| 8,654,457 B2 | 2/2014 | Jin et al. |
| 8,917,457 B2 | 12/2014 | Matsusaka et al. |

(Continued)

FOREIGN PATENT DOCUMENTS

| JP | 2012-008489 | 1/2012 |
| JP | 2013-140398 A | 7/2013 |

(Continued)

OTHER PUBLICATIONS

English translation of abstract of JP 2012-008489 (Jan. 12, 2012).
(Continued)

*Primary Examiner* — Scott J Sugarman
*Assistant Examiner* — Vipin Patel
(74) *Attorney, Agent, or Firm* — McClure, Qualey & Rodack, LLP

(57) ABSTRACT

A photographing lens system includes, in order from an object side to an image side, a first lens element, a second lens element, a third lens element, a fourth lens element and a fifth lens element. The first lens element with refractive power has a convex object-side surface. The second lens element has refractive power. The third lens element with refractive power has a convex object-side surface and a concave image-side surface. The fourth lens element with refractive power has an object-side surface and an image-side surface being both aspheric. The fifth lens element with refractive power has a concave image-side surface, wherein an object-side surface and the image-side surface thereof are aspheric, and the image-side surface of the fifth lens element has at least one convex shape in an off-axial region thereof. The photographing lens system has a total of five lens elements with refractive power.

26 Claims, 21 Drawing Sheets

(51) Int. Cl.
   *G02B 13/00*   (2006.01)
   *H04N 5/374*   (2011.01)
   *H04N 5/225*   (2006.01)

(56) References Cited

U.S. PATENT DOCUMENTS

| | | |
|---|---|---|
| 2013/0100546 A1 | 4/2013 | Okano |
| 2014/0153114 A1 | 6/2014 | Suzuki |
| 2015/0009813 A1 | 1/2015 | Nguyen |
| 2015/0098137 A1 | 4/2015 | Chung et al. |
| 2015/0130999 A1* | 5/2015 | Tsai .................. G02B 9/60 348/374 |
| 2015/0168676 A1 | 6/2015 | Lee et al. |

FOREIGN PATENT DOCUMENTS

| | | |
|---|---|---|
| JP | 2014-112131 | 6/2014 |
| JP | 2014-123097 A | 7/2014 |
| KR | 10-2011-0071554 | 6/2011 |
| TW | 201337321 | 9/2013 |
| TW | 201344235 | 11/2013 |
| TW | 201403117 | 1/2014 |
| TW | 201409070 | 3/2014 |
| TW | 201409070 A | 3/2014 |
| TW | 201418762 | 5/2014 |
| TW | 201425994 A | 7/2014 |
| WO | 2010-001713 | 1/2010 |
| WO | 2011/118554 A1 | 9/2011 |

OTHER PUBLICATIONS

English translation of abstract of JP 2014-112131 (Jun. 19, 2014).
English translation of abstract of KR 10-2011-0071554 (Jun. 29, 2011).
English translation of abstract of WO 2010-001713 (Jan. 7, 2010).
English translation of abstract of TW 201337321 (Sep. 16, 2013).
English translation of abstract of TW 201344235 (Nov. 1, 2013).
English translation of abstract of TW 201403117 (Jan. 16, 2014).
English translation of abstract of TW 201409070 (Mar. 1, 2014).
English translation of abstract of TW 201418762 (May 16, 2014).

* cited by examiner

000
PHOTOGRAPHING LENS SYSTEM, IMAGE CAPTURING DEVICE AND ELECTRONIC DEVICE

RELATED APPLICATIONS

This application claims priority to Taiwan Application Serial Number 103133785, filed Sep. 29, 2014, which is herein incorporated by reference.

BACKGROUND

1. Technical Field

The present disclosure relates to a photographing lens system and an image capturing device. More particularly, the present disclosure relates to a compact photographing lens system and image capturing device applicable to electronic devices.

2. Description of Related Art

In recent years, with the popularity of mobile terminals having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in a portable electronic product mainly adopts a four-element lens structure. Due to the popularity of mobile terminals with high-end specifications, such as smart phones, tablet personal computers and wearable apparatus, the requirements for high resolution and image quality of present compact optical systems increase significantly. However, the conventional optical systems cannot satisfy these requirements of the compact optical systems.

Other conventional compact optical systems with five-element lens structure enhance image quality and resolution. However, the distribution of the refractive power of the conventional five-element lens optical system would bring excessive aberration and the feature of large field of view cannot be presented obviously. Therefore, it is unfavorable for adjusting the moldability and the photosensitivity of the conventional optical systems, and also unfavorable for providing high image quality.

SUMMARY

According to one aspect of the present disclosure, a photographing lens system includes, in order from an object side to an image side, a first lens element, a second lens element, a third lens element, a fourth lens element and a fifth lens element. The first lens element with refractive power has a convex object-side surface. The second lens element has refractive power. The third lens element with refractive power has a convex object-side surface and a concave image-side surface. The fourth lens element with refractive power has an object-side surface and an image-side surface being both aspheric. The fifth lens element with refractive power has a concave image-side surface, wherein an object-side surface and the image-side surface of the fifth lens element are aspheric, and the image-side surface of the fifth lens element has at least one convex shape in an off-axial region thereof. The photographing lens system has a total of five lens elements with refractive power, and there is an air space between any two lens elements of the first lens element, the second lens element, the third lens element, the fourth lens element and the fifth lens element that are adjacent to each other. The photographing lens system further includes a stop. When a focal length of the photographing lens system is f, a focal length of the first lens element is f1, a focal length of the second lens element is f2, a focal length of the third lens element is f3, a central thickness of the third lens element is CT3, a central thickness of the fourth lens element is CT4, a central thickness of the fifth lens element is CT5, a curvature radius of the object-side surface of the third lens element is R5, a curvature radius of the image-side surface of the third lens element is R6, an axial distance between the stop and the image-side surface of the fifth lens element is SD, and an axial distance between the object-side surface of the first lens element and the image-side surface of the fifth lens element is TD, the following conditions are satisfied:

$|f/f1|+|f/f2|+|f/f3|<0.95;$ $(CT3+CT5)/CT4<0.85;$ $0.20<R6/R5;$ and $0.65<SD/TD<1.0.$ According to another aspect of the present disclosure, an image capturing device includes the photographing lens system according to the aforementioned aspect and an image sensor, wherein the image sensor is disposed on an image surface of the photographing lens system.

According to further another aspect of the present disclosure, an electronic device includes the image capturing device according to the aforementioned aspect.

According to yet another aspect of the present disclosure, a photographing lens system includes, in order from an object side to an image side, a first lens element, a second lens element, a third lens element, a fourth lens element and a fifth lens element. The first lens element with refractive power has a convex object-side surface. The second lens element has refractive power. The third lens element has refractive power. The fourth lens element with refractive power has an object-side surface and an image-side surface being both aspheric. The fifth lens element with refractive power has a concave image-side surface, wherein both of an object-side surface and the image-side surface of the fifth lens element are aspheric, and the image-side surface of the fifth lens element has at least one convex shape in an off-axial region thereof. The photographing lens system has a total of five lens elements with refractive power, and there is an air space between any two lens elements of the first lens element, the second lens element, the third lens element, the fourth lens element and the fifth lens element that are adjacent to each other. The photographing lens system further includes a stop. When a focal length of the photographing lens system is f, a focal length of the first lens element is f1, a focal length of the second lens element is f2, a focal length of the third lens element is f3, an axial distance between the stop and the image-side surface of the fifth lens element is SD, and an axial distance between the object-side surface of the first lens element and the image-side surface of the fifth lens element is TD, the following conditions are satisfied:

$|f/f1|+|f/f2|+|f/f3|<0.50;$ and $0.65<SD/TD<1.0.$

According to still another aspect of the present disclosure, an image capturing device includes the photographing lens system according to the aforementioned aspect and an image sensor, wherein the image sensor is disposed on an image surface of the photographing lens system.

According to further another aspect of the present disclosure, an electronic device includes the image capturing device according to the aforementioned aspect.

DETAILED DESCRIPTION

Figure 1:
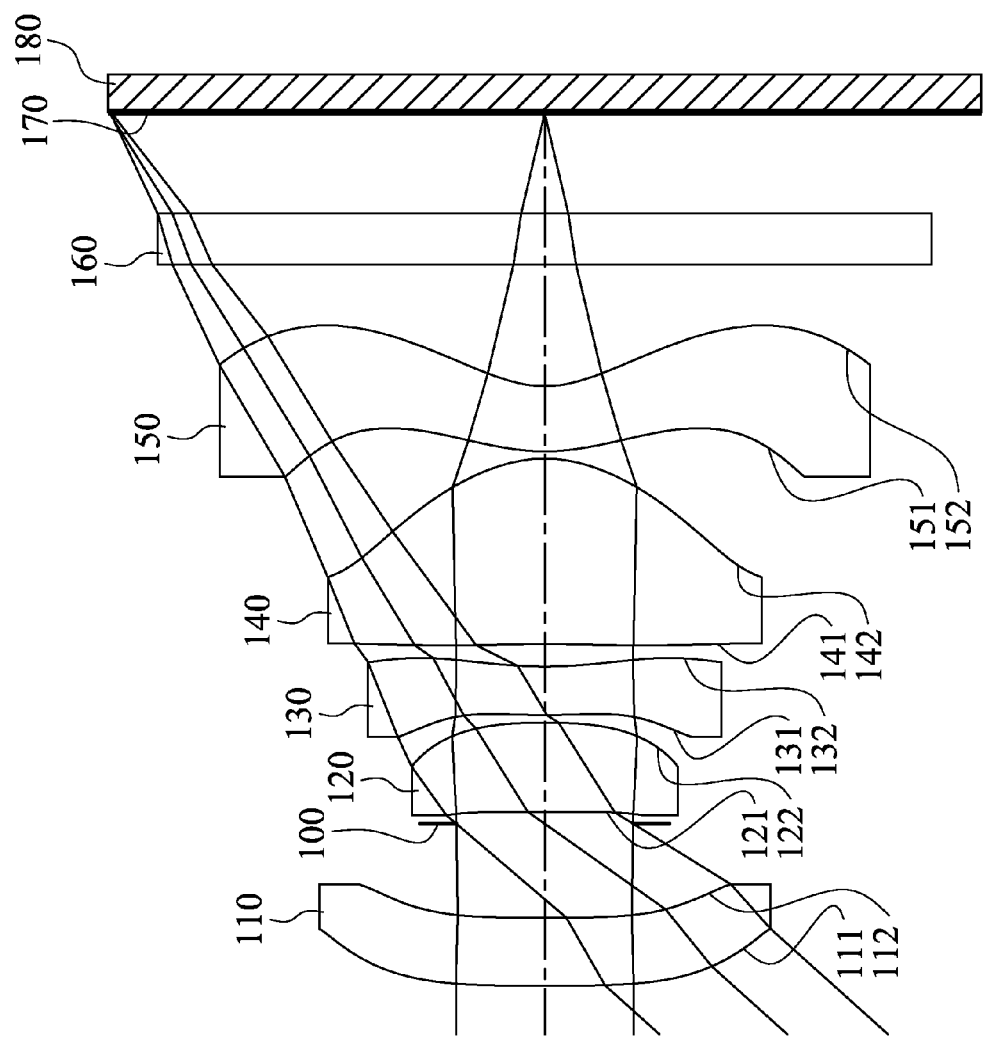
FIG. 1 is a schematic view of an image capturing device according to the 1st embodiment of the present disclosure.

A photographing lens system includes, in order from an object side to an image side, a first lens element, a second lens element, a third lens element, a fourth lens element and a fifth lens element. The photographing lens system has a total of five lens elements with refractive power.

There is an air space between any two lens elements of the first lens element, the second lens element, the third lens element, the fourth lens element and the fifth lens element that are adjacent to each other. That is, each of the first through fifth lens elements is a single and non-cemented lens element, and any two lens elements adjacent to each other are not cemented, and there is a space between the two lens elements. Moreover, the manufacturing process of the cemented lenses is more complex than the non-cemented lenses. In other words, of the first lens element, the second lens element, the third lens element, the fourth lens element and the fifth lens element of the photographing lens system, there is a space in a paraxial region between every pair of lens elements that are adjacent to each other. In particular, a second surface of one lens element and a first surface of the following lens element need to have accurate curvature to ensure these two lens elements will be highly cemented. However, during the cementing process, those two lens elements might not be highly cemented due to displacement and it is thereby not favorable for the image quality of the photographing lens system. Therefore, according to the photographing lens system of the present disclosure, an air space in a paraxial region between any two of the first lens element, the second lens element, the third lens element, the fourth lens element, and the fifth lens element that are adjacent to each other of the present disclosure improves the problem generated by the cemented lens elements.

The first lens element has a convex object-side surface, so that the total track length of the photographing lens system can be reduced.

The third lens element can have negative refractive power, and can have a convex object-side surface and a concave image-side surface, so that the aberration of the photographing lens system can be corrected for increasing the image quality. Furthermore, the image-side surface of the third lens element can have at least one convex shape in an off-axial region thereof, so that the peripheral aberration of the photographing lens system can be corrected.

The fourth lens element can have positive refractive power, so that the photosensitivity of the photographing lens system can be reduced effectively.

The fifth lens element can have negative refractive power and a convex object-side surface, and has a concave image-side surface. Therefore, the astigmatism can be corrected for increasing the image quality. Furthermore, the image-side surface of the fifth lens element has at least one convex shape in an off-axial region thereof, so that the aberration of the off-axis field can be corrected for obtaining high image quality.

When a focal length of the photographing lens system is f, a focal length of the first lens element is f1, a focal length of the second lens element is f2, and a focal length of the third lens element is f3, the following condition is satisfied: $|f/f1|+|f/f2|+|f/f3|<0.95$. The convergence speed of the incident light rays through the front part of the photographing lens system can be moderated by the weaker refractive powers of the first lens element to the third lens element. Therefore, the larger field of view of the photographing lens system can be obtained, and the aberration can be reduced. Moreover, the shape variation of the first lens element to the third lens element can be reduced by the weaker refractive powers, so that the moldability and the photosensitivity will be proper. Preferably, the following condition can be satisfied: $|f/f1|+|f/f2|+|f/f3|<0.80$. More preferably, the following condition can be satisfied: $|f/f1|+|f/f2|+|f/f3|<0.50$.

When a central thickness of the third lens element is CT3, a central thickness of the fourth lens element is CT4, and a central thickness of the fifth lens element is CT5, the following condition is satisfied: (CT3+CT5)/CT4<0.85. Therefore, the moldability and homogeneity of the lens elements can be enhanced for increasing the manufacturing yield rate.

When a curvature radius of the object-side surface of the third lens element is R5, and a curvature radius of the image-side surface of the third lens element is R6, the following condition is satisfied: 0.20<R6/R5. Therefore, the aberration of the photographing lens system can be corrected for increasing the image quality.

The photographing lens system further includes a stop, such as an aperture stop. When an axial distance between the stop and the image-side surface of the fifth lens element is SD, and an axial distance between the object-side surface of the first lens element and the image-side surface of the fifth lens element is TD, the following condition is satisfied: 0.65<SD/TD<1.0. Therefore, it is favorable for obtaining a balance between telecentricity and the functionality of wide viewing angle.

When a focal length of the photographing lens system is f, a focal length of the fourth lens element is f4, and a focal length of the fifth lens element is f5, the following condition is satisfied: 2.0<|f/f4|+|f/f5|<4.0. Therefore, the photosensitivity of the photographing lens system can be reduced, and the astigmatism thereof can be corrected.

When an axial distance between the first lens element and the second lens element is T12, an axial distance between the second lens element and the third lens element is T23, an axial distance between the third lens element and the fourth lens element is T34, and an axial distance between the fourth lens element and the fifth lens element is T45, the following condition is satisfied: 1.5<T12/(T23+T34+T45)<4.5. Therefore, it is favorable for assembling the lens elements to increase the manufacturing yield rate.

When the focal length of the photographing lens system is f, and a maximum effective radius of the image-side surface of the fifth lens element is SD52, the following condition is satisfied: 1.0<f/SD52<1.35. Therefore, the aberration of the off-axis field can be corrected for obtaining high image quality.

When an f-number of the photographing lens system is Fno, the following condition is satisfied: 1.6<Fno<2.5. Therefore, it is favorable for the photographing lens system obtaining large aperture so as to take sharp images under insufficient light conditions.

When a maximum effective radius of the object-side surface of the first lens element is SD11, and a maximum effective radius of the image-side surface of the fifth lens element is SD52, the following condition is satisfied: 0.60<SD11/SD52<0.80. Therefore, the peripheral aberration of the photographing lens system can be corrected for improving the image quality.

When the central thickness of the fourth lens element is CT4, a sum of central thicknesses of the first lens element, the second lens element, and the third lens element, the fourth lens element and the fifth lens element is ΣCT, the following condition is satisfied: 0.33<CT4/ΣCT<0.60. Therefore, the moldability and homogeneity of the lens elements can be enhanced for increasing the manufacturing yield rate, and the total track length can be maintained properly.

When an Abbe number of the third lens element is V3, and an Abbe number of the fifth lens element is V5, the following condition is satisfied: 25<V3+V5<55. Therefore, it is favorable for correcting the chromatic aberration and improving the true color of the images.

When a maximum image height of the photographing lens system (half of a diagonal length of an effective photosensitive area of an image sensor) is ImgH, and an axial distance between the image-side surface of the fifth lens element and an image surface is BL, the following condition is satisfied: 1.3<ImgH/BL<2.5. Therefore, the back focal length of the photographing lens system can be reduced for maintaining a compact size thereof.

When the focal length of the photographing lens system is f, and a curvature radius of the image-side surface of the fifth lens element is R10, the following condition is satisfied: 0<R10/f<0.40. Therefore, the astigmatism of the photographing lens system can be corrected effectively for increasing the image quality.

According to the photographing lens system of the present disclosure, the lens elements thereof can be made of glass or plastic material. When the lens elements are made of glass material, the distribution of the refractive powers of the photographing lens system may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the photographing lens system can also be reduced.

According to the photographing lens system of the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, when the lens element has a convex surface, it indicates that the surface is convex in the paraxial region thereof; when the lens element has a concave surface, it indicates that the surface is concave in the paraxial region thereof.

According to the photographing lens system of the present disclosure, the positive refractive power or the negative refractive power of a lens element or the focal length of the lens element, that is, refers to the refractive power or the focal length in a paraxial region of the lens element.

According to the photographing lens system of the present disclosure, the photographing lens system can include at least one stop, such as an aperture stop, a glare stop or a field stop. Said glare stop or said field stop is for eliminating the stray light and thereby improving the image resolution thereof.

According to the photographing lens system of the present disclosure, an image surface of the photographing lens system, based on the corresponding image sensor, can be flat or curved. In particular, the image surface can be a curved surface being concave facing towards the object side.

According to the photographing lens system of the present disclosure, an aperture stop can be configured as a front stop or a middle stop. A front stop disposed between an imaged object and the first lens element can provide a longer distance between an exit pupil of the photographing optical lens assembly and the image surface and thereby improves the image-sensing efficiency of an image sensor. A middle stop disposed between the first lens element and the image surface is favorable for enlarging the field of view of the photographing lens system and thereby provides a wider field of view for the same.

According to the photographing lens system of the present disclosure, the photographing lens system can be optionally applied to moving focus optical systems, and is featured with good ability for correcting aberration and high image quality. The photographing lens system of the present disclosure also can be applied to 3D (three-dimensional) image capturing applications, in products such as digital cameras, mobile devices, digital tablets, smart TV, internet monitoring device, game consoles with motion sensing function, driving recording systems, rear view camera systems, and wearable devices.

According to the present disclosure, an image capturing device is provided. The image capturing device includes the aforementioned photographing lens system and an image sensor, wherein the image sensor is disposed on the image side of the aforementioned photographing lens system, that is, the image sensor can be disposed on or near an image surface of the aforementioned photographing lens system. In the image capturing device, the convergence speed of the incident light rays through the front part of the photographing lens system can be moderated due to the weaker total refractive powers of the first lens element to the third lens element. Therefore, the larger field of view of the image capturing device can be obtained, and the aberration can be reduced. Moreover, the shape variation of the first lens element to the third lens element can be reduced by the weaker refractive powers, so that the balance between the moldability and the photosensitivity is proper, and the image quality of the image capturing device can be increased. Preferably, the image capturing device can further include a barrel member, a holding member or a combination thereof.

According to the present disclosure, an electronic device is provided. The electronic device includes the aforementioned image capturing device. Therefore, the image quality of the electronic device can be increased. Preferably, the electronic device can further include but not limited to a control unit, a display, a storage unit, a random access memory unit (RAM), a read only memory unit (ROM) or a combination thereof.

According to the above description of the present disclosure, the following 1st-12th specific embodiments are provided for further explanation.

1st Embodiment

Figure 2:
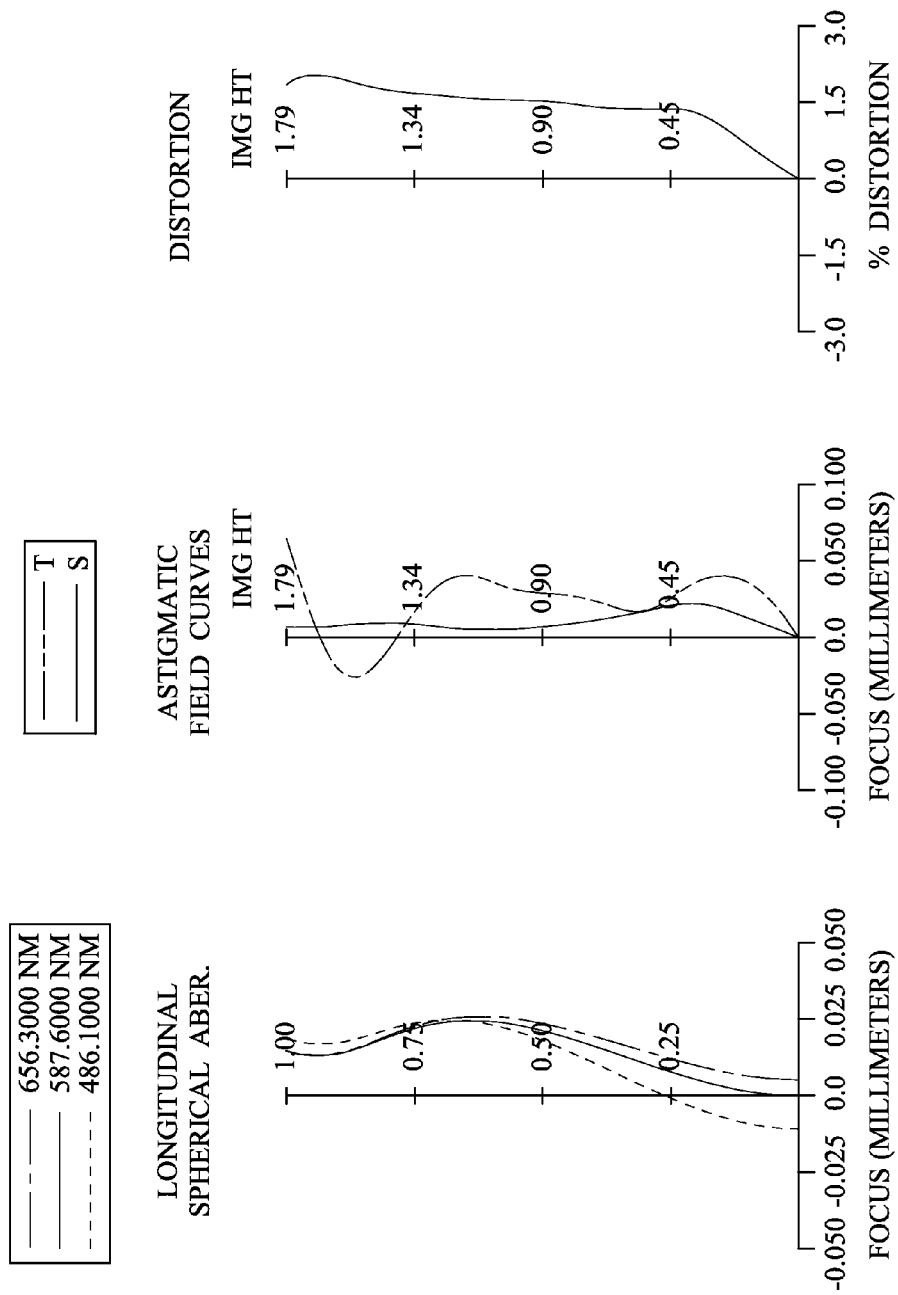
FIG. 2 shows spherical aberration curves, astigmatic field curves and a distortion curve of the image capturing device according to the 1st embodiment.

FIG. 1 is a schematic view of an image capturing device according to the 1st embodiment of the present disclosure. FIG. 2 shows spherical aberration curves, astigmatic field curves and a distortion curve of the image capturing device according to the 1st embodiment. In FIG. 1, the image capturing device includes a photographing lens system (its reference numeral is omitted) and an image sensor 180. The photographing lens system includes, in order from an object side to an image side, a first lens element 110, an aperture stop 100, a second lens element 120, a third lens element 130, a fourth lens element 140, a fifth lens element 150, an IR-cut filter 160 and an image surface 170, wherein the image sensor 180 is disposed on the image surface 170 of the photographing lens system. The photographing lens system has a total of five lens elements (110-150) with refractive power, and there is an air space in a paraxial region between any two of the first lens element 110, the second lens element 120, the third lens element 130, the fourth lens element 140, and the fifth lens element 150 that are adjacent to each other.

The first lens element 110 with negative refractive power has a convex object-side surface 111 and a concave image-side surface 112. The first lens element 110 is made of plastic material, and has the object-side surface 111 and the image-side surface 112 being both aspheric.

The second lens element 120 with positive refractive power has a concave object-side surface 121 and a convex image-side surface 122. The second lens element 120 is made of plastic material, and has the object-side surface 121 and the image-side surface 122 being both aspheric.

The third lens element 130 with negative refractive power has a convex object-side surface 131 and a concave image-side surface 132. The third lens element 130 is made of plastic material, and has the object-side surface 131 and the image-side surface 132 being both aspheric. Furthermore, the image-side surface 132 of the third lens element 130 has a convex shape in an off-axial region thereof.

The fourth lens element 140 with positive refractive power has a concave object-side surface 141 and a convex image-side surface 142. The fourth lens element 140 is made of plastic material, and has the object-side surface 141 and the image-side surface 142 being both aspheric.

The fifth lens element 150 with negative refractive power has a convex object-side surface 151 and a concave image-side surface 152. The fifth lens element 150 is made of plastic material, and has the object-side surface 151 and the image-side surface 152 being both aspheric. Furthermore, the image-side surface 152 of the fifth lens element 150 has a convex shape in an off-axial region thereof.

The IR-cut filter 160 is made of glass material and located between the fifth lens element 150 and the image surface 170, and will not affect a focal length of the photographing lens system.

The equation of the aspheric surface profiles of the aforementioned lens elements of the 1st embodiment is expressed as follows:

$$X(Y) = (Y^2/R)/(1+sqrt(1-(1+k)\times(Y/R)^2)) + \sum_i (Ai)+(Y^i)$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the photographing lens system according to the 1st embodiment, when a focal length of the photographing lens system is f, an f-number of the photographing lens system is Fno, and half of a maximal field of view of the photographing lens system is HFOV, these parameters have the following values: f=1.57 mm; Fno=2.15; and HFOV=48.0 degrees.

In the photographing lens system according to the 1st embodiment, when an Abbe number of the third lens element 130 is V3, and an Abbe number of the fifth lens element 150 is V5, the following condition is satisfied: V3+V5=47.0.

In the photographing lens system according to the 1st embodiment, when a central thickness of the third lens element 130 is CT3, a central thickness of the fourth lens element 140 is CT4, and a central thickness of the fifth lens element 150 is CT5, the following condition is satisfied: (CT3+CT5)/CT4=0.61.

In the photographing lens system according to the 1st embodiment, when the central thickness of the fourth lens element 140 is CT4, and a sum of central thicknesses of the first lens element 110, the second lens element 120, the third lens element 130, the fourth lens element 140 and the fifth lens element 150 is ΣCT, the following condition is satisfied: CT4/ΣCT=0.41.

In the photographing lens system according to the 1st embodiment, when an axial distance between the first lens element 110 and the second lens element 120 is T12, an axial distance between the second lens element 120 and the third lens element 130 is T23, an axial distance between the third lens element 130 and the fourth lens element 140 is T34, an axial distance between the fourth lens element 140 and the fifth lens element 150 is T45, and the following condition is satisfied: T12/(T23+T34+T45)=2.83. In the photographing lens system according to the 1st embodiment, when an axial distance between the aperture stop 100 and the image-side surface 152 of the fifth lens element 150 is SD, and an axial distance between the object-side surface 111 of the first lens element 110 and the image-side surface 152 of the fifth lens element 150 is TD, the following condition is satisfied: SD/TD=0.73.

In the photographing lens system according to the 1st embodiment, when a curvature radius of the object-side surface 131 of the third lens element 130 is R5, a curvature radius of the image-side surface 132 of the third lens element 130 is R6, and the following condition is satisfied: R6/R5=0.72.

In the photographing lens system according to the 1st embodiment, when the focal length of the photographing lens system is f, and a curvature radius of the image-side surface 152 of the fifth lens element 150 is R10, and the following condition is satisfied: R10/f=0.28.

In the photographing lens system according to the 1st embodiment, when the focal length of the photographing lens system is f, a focal length of the first lens element 110 is f1, a focal length of the second lens element 120 is f2, a focal length of the third lens element 130 is f3, a focal length of the fourth lens element 140 is f4, and a focal length of the fifth lens element 150 is f5, and the following conditions are satisfied: |f/f1|+|f/f2|+|f/f3|=0.41; and |f/f4|+|f/f5|=2.29.

In the photographing lens system according to the 1st embodiment, when the focal length of the photographing lens system is f, a maximum effective radius of the object-side surface 111 of the first lens element 110 is SD11, and a maximum effective radius of the image-side surface 152 of the fifth lens element 150 is SD52, the following conditions are satisfied: SD11/SD52=0.69; and f/SD52=1.17.

In the photographing lens system according to the 1st embodiment, when a maximum image height of the photographing lens system (half of a diagonal length of an effective photosensitive area of the image sensor 180) is ImgH, and an axial distance between the image-side surface 152 of the fifth lens element 150 and the image surface 170 is BL, the following condition is satisfied: ImgH/BL=1.59.

The detailed optical data of the 1st embodiment are shown in Table 1 and the aspheric surface data are shown in Table 2 below.

TABLE 1

1st Embodiment
f = 1.57 mm, Fno = 2.15, HFOV = 48.0 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Lens 1 | 35.639 | ASP | 0.280 | Plastic | 1.544 | 55.9 | −248.32 |
| 2 |  | 28.123 | ASP | 0.387 |  |  |  |  |
| 3 | Ape. Stop | Plano |  | 0.049 |  |  |  |  |
| 4 | Lens 2 | −93.005 | ASP | 0.367 | Plastic | 1.544 | 55.9 | 5.94 |
| 5 |  | −3.128 | ASP | 0.031 |  |  |  |  |
| 6 | Lens 3 | 2.431 | ASP | 0.200 | Plastic | 1.639 | 23.5 | −11.21 |
| 7 |  | 1.757 | ASP | 0.093 |  |  |  |  |
| 8 | Lens 4 | −5.015 | ASP | 0.763 | Plastic | 1.544 | 55.9 | 1.08 |
| 9 |  | −0.553 | ASP | 0.030 |  |  |  |  |
| 10 | Lens 5 | 0.871 | ASP | 0.268 | Plastic | 1.639 | 23.5 | −1.87 |
| 11 |  | 0.443 | ASP | 0.500 |  |  |  |  |
| 12 | IR-cut filter | Plano |  | 0.210 | Glass | 1.517 | 64.2 | — |
| 13 |  | Plano |  | 0.418 |  |  |  |  |
| 14 | Image | Plano |  | — |  |  |  |  |

Note:
Reference wavelength is 587.6 nm (d-line).

TABLE 2

Aspheric Coefficients

| Surface # | 1 | 2 | 4 | 5 | 6 |
|---|---|---|---|---|---|
| k = | −1.0000E+00 | −1.1374E+01 | −9.0000E+01 | 7.0928E+00 | 3.9526E+00 |
| A4 = | 4.0070E−01 | 5.3190E−01 | −1.4825E−01 | −2.4101E+00 | −2.7744E+00 |
| A6 = | −2.4834E−01 | 6.3515E−01 | −2.3425E+00 | 1.2107E+01 | 9.7773E+00 |
| A8 = | 3.8421E−02 | −8.0922E+00 | 1.2653E+01 | −6.1745E+01 | −4.3459E+01 |
| A10 = | 8.9958E−01 | 3.2418E+01 | −7.4240E+01 | 1.7456E+02 | 1.2494E+02 |
| A12 = | −2.0699E+00 | −6.0276E+01 |  | −2.2602E+02 | −1.5898E+02 |
| A14 = | 2.4485E+00 | 4.8954E+01 |  |  | 7.0505E+01 |
| A16 = | −1.2505E+00 | −1.3666E+01 |  |  |  |

| Surface # | 7 | 8 | 9 | 10 | 11 |
|---|---|---|---|---|---|
| k = | −1.5804E+01 | 2.2153E+01 | −1.8066E+00 | −9.3891E+00 | −3.5545E+00 |
| A4 = | −2.3568E−01 | 5.5799E−01 | 3.2051E−01 | 2.3852E−02 | −4.3700E−01 |

TABLE 2-continued

Aspheric Coefficients

| A6 = | −1.6251E+00 | −1.8629E+00 | −2.6494E+00 | −1.8558E+00 | 3.6336E−01 |
|---|---|---|---|---|---|
| A8 = | 1.0149E+01 | 7.5642E+00 | 7.6950E+00 | 4.7931E+00 | −1.6404E−01 |
| A10 = | −3.1663E+01 | −2.1397E+01 | −1.2716E+01 | −6.6323E+00 | −6.7247E−02 |
| A12 = | 4.6718E+01 | 3.0215E+01 | 1.2469E+01 | 4.9194E+00 | 1.1317E−01 |
| A14 = | −2.4655E+01 | −1.6109E+01 | −5.0692E+00 | −1.8116E+00 | −4.8003E−02 |
| A16 = | | | −2.9152E−02 | 2.6080E−01 | 7.0845E−03 |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
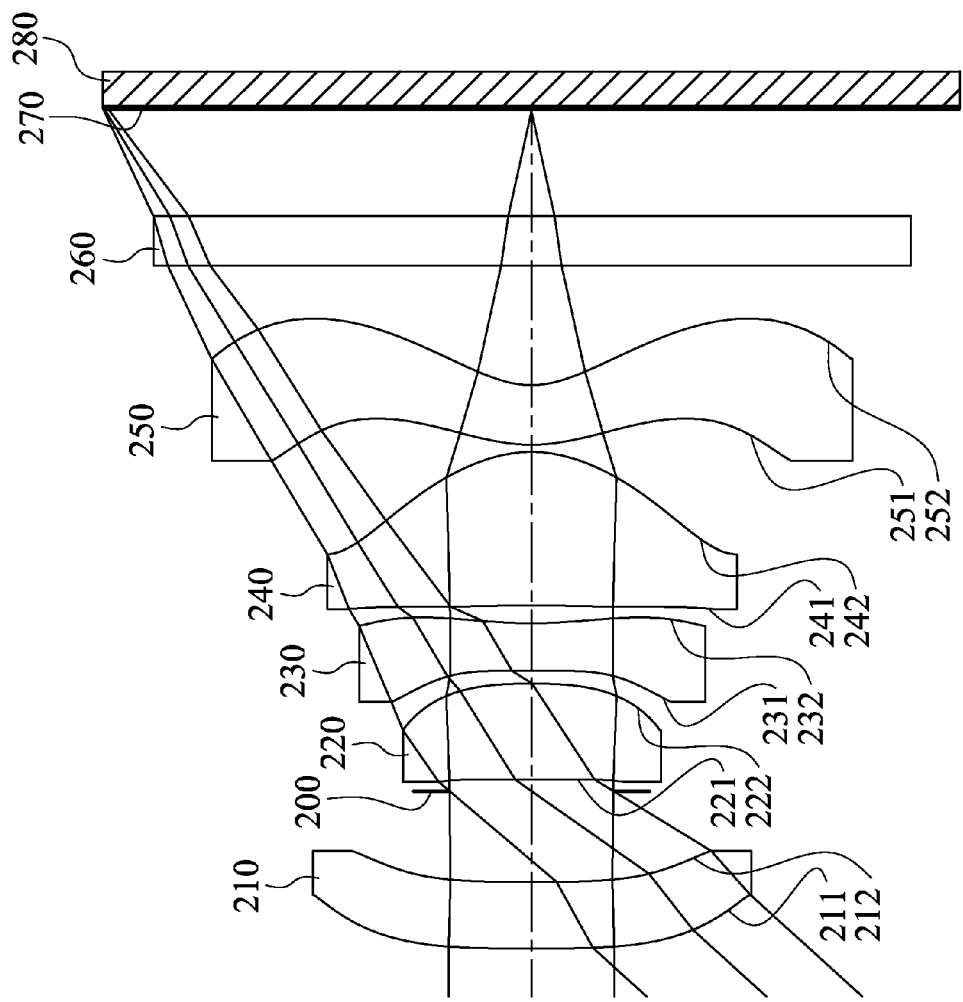
FIG. 3 is a schematic view of an image capturing device according to the 2nd embodiment of the present disclosure.
Figure 4:
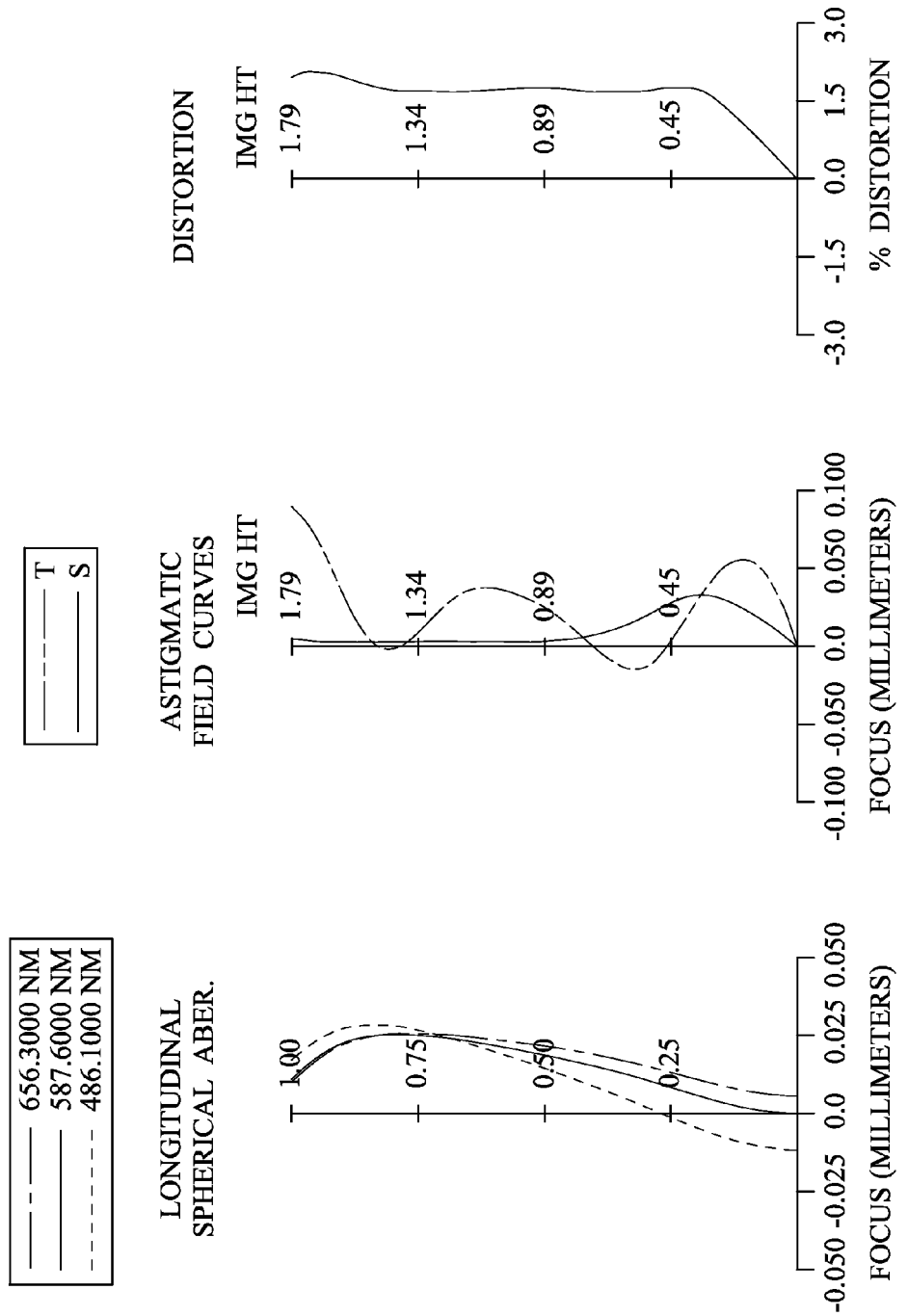
FIG. 4 shows spherical aberration curves, astigmatic field curves and a distortion curve of the image capturing device according to the 2nd embodiment.

FIG. 3 is a schematic view of an image capturing device according to the 2nd embodiment of the present disclosure. FIG. 4 shows spherical aberration curves, astigmatic field curves and a distortion curve of the image capturing device according to the 2nd embodiment. In FIG. 3, the image capturing device includes a photographing lens system (its reference numeral is omitted) and an image sensor 280. The photographing lens system includes, in order from an object side to an image side, a first lens element 210, an aperture stop 200, a second lens element 220, a third lens element 230, a fourth lens element 240, a fifth lens element 250, an IR-cut filter 260 and an image surface 270, wherein the image sensor 280 is disposed on the image surface 270 of the photographing lens system. The photographing lens system has a total of five lens elements (210-250) with refractive power, and there is an air space in a paraxial region between any two of the first lens element 210, the second lens element 220, the third lens element 230, the fourth lens element 240, and the fifth lens element 250 that are adjacent to each other.

The first lens element 210 with positive refractive power has a convex object-side surface 211 and a concave image-side surface 212. The first lens element 210 is made of glass material, and has the object-side surface 211 and the image-side surface 212 being both aspheric.

The second lens element 220 with positive refractive power has a convex object-side surface 221 and a convex image-side surface 222. The second lens element 220 is made of plastic material, and has the object-side surface 221 and the image-side surface 222 being both aspheric.

The third lens element 230 with negative refractive power has a convex object-side surface 231 and a concave image-side surface 232. The third lens element 230 is made of plastic material, and has the object-side surface 231 and the image-side surface 232 being both aspheric. Furthermore, the image-side surface 232 of the third lens element 230 has a convex shape in an off-axial region thereof.

The fourth lens element 240 with positive refractive power has a concave object-side surface 241 and a convex image-side surface 242. The fourth lens element 240 is made of plastic material, and has the object-side surface 241 and the image-side surface 242 being both aspheric.

The fifth lens element 250 with negative refractive power has a convex object-side surface 251 and a concave image-side surface 252. The fifth lens element 250 is made of plastic material, and has the object-side surface 251 and the image-side surface 252 being both aspheric. Furthermore, the image-side surface 252 of the fifth lens element 250 has a convex shape in an off-axial region thereof.

The IR-cut filter 260 is made of glass material and located between the fifth lens element 250 and the image surface 270, and will not affect a focal length of the photographing lens system.

The detailed optical data of the 2nd embodiment are shown in Table 3 and the aspheric surface data are shown in Table 4 below.

TABLE 3

2nd Embodiment
f = 1.58 mm, Fno = 2.28, HFOV = 47.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 21.485 | ASP | 0.280 | Glass | 1.592 | 60.6 | 565.73 |
| 2 | | 22.847 | ASP | 0.381 | | | | |
| 3 | Ape. Stop | Plano | | 0.047 | | | | |
| 4 | Lens 2 | 13.974 | ASP | 0.404 | Plastic | 1.544 | 55.9 | 4.28 |
| 5 | | −2.766 | ASP | 0.053 | | | | |
| 6 | Lens 3 | 5.137 | ASP | 0.200 | Plastic | 1.650 | 21.5 | −4.19 |
| 7 | | 1.754 | ASP | 0.075 | | | | |
| 8 | Lens 4 | −5.358 | ASP | 0.644 | Plastic | 1.544 | 55.9 | 1.06 |
| 9 | | −0.542 | ASP | 0.030 | | | | |
| 10 | Lens 5 | 0.698 | ASP | 0.250 | Plastic | 1.535 | 55.7 | −2.04 |
| 11 | | 0.373 | ASP | 0.500 | | | | |

TABLE 3-continued

2nd Embodiment
f = 1.58 mm, Fno = 2.28, HFOV = 47.8 deg.

| Surface # | | Curvature Radius | Thickness | Material | Index | Abbe # | Focal Length |
|---|---|---|---|---|---|---|---|
| 12 | IR-cut filter | Plano | 0.210 | Glass | 1.517 | 64.2 | — |
| 13 | | Plano | 0.451 | | | | |
| 14 | Image | Plano | — | | | | |

Note:
Reference wavelength is 587.6 nm (d-line).

| Aspheric Coefficients | | | | | |
|---|---|---|---|---|---|
| Surface # | 1 | 2 | 4 | 5 | 6 |
| k = | −7.8390E+01 | −1.1374E+01 | −9.0000E+01 | 9.4756E+00 | −8.3640E+01 |
| A4 = | 4.2099E−01 | 5.3434E−01 | −2.5513E−01 | −2.5071E+00 | −3.0938E+00 |
| A6 = | −4.9271E−01 | 4.7835E−01 | −1.1300E+00 | 1.1562E+01 | 1.0227E+01 |
| A8 = | 1.1591E+00 | −7.0603E+00 | −3.8870E+00 | −6.0723E+01 | −3.9280E+01 |
| A10 = | −1.9021E+00 | 2.8438E+01 | −2.3907E+01 | 1.7351E+02 | 1.1744E+02 |
| A12 = | 1.8024E+00 | −5.3030E+01 | | −2.2602E+02 | −1.5898E+02 |
| A14 = | −3.5220E−01 | 4.3115E+01 | | | 7.0505E+01 |
| A16 = | −4.3330E−01 | −1.2039E+01 | | | |

| Surface # | 7 | 8 | 9 | 10 | 11 |
|---|---|---|---|---|---|
| k = | −5.6408E+01 | 1.3419E+01 | −1.7328E+00 | −8.6294E+00 | −3.3697E+00 |
| A4 = | −1.9663E−01 | 5.5075E−01 | 3.3059E−01 | 4.6207E−03 | −4.2376E−01 |
| A6 = | −1.5496E+00 | −1.9773E+00 | −2.6107E+00 | −1.8487E+00 | 2.8122E−01 |
| A8 = | 9.9238E+00 | 7.4095E+00 | 7.7727E+00 | 4.8044E+00 | −6.2575E−03 |
| A10 = | −3.1700E+01 | −2.1325E+01 | −1.2598E+01 | −6.6232E+00 | −2.3012E−01 |
| A12 = | 4.6718E+01 | 3.0731E+01 | 1.2581E+01 | 4.9249E+00 | 2.1053E−01 |
| A14 = | −2.4655E+01 | −1.6533E+01 | −5.0732E+00 | −1.8108E+00 | −8.0637E−02 |
| A16 = | | | −3.3523E−01 | 2.5631E−01 | 1.1832E−02 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 1.58 | R6/R5 | 0.34 |
| Fno | 2.28 | R10/f | 0.24 |
| HFOV [deg.] | 47.8 | |f/f1| + |f/f2| + |f/f3| | 0.75 |
| V3 + V5 | 77.2 | |f/f4| + |f/f5| | 2.27 |
| (CT3 + CT5)/CT4 | 0.70 | SD11/SD52 | 0.68 |
| CT4/ΣCT | 0.36 | f/SD52 | 1.18 |
| T12/(T23 + T34 + T45) | 2.71 | ImgH/BL | 1.54 |
| SD/TD | 0.72 | | |

3rd Embodiment

Figure 5:
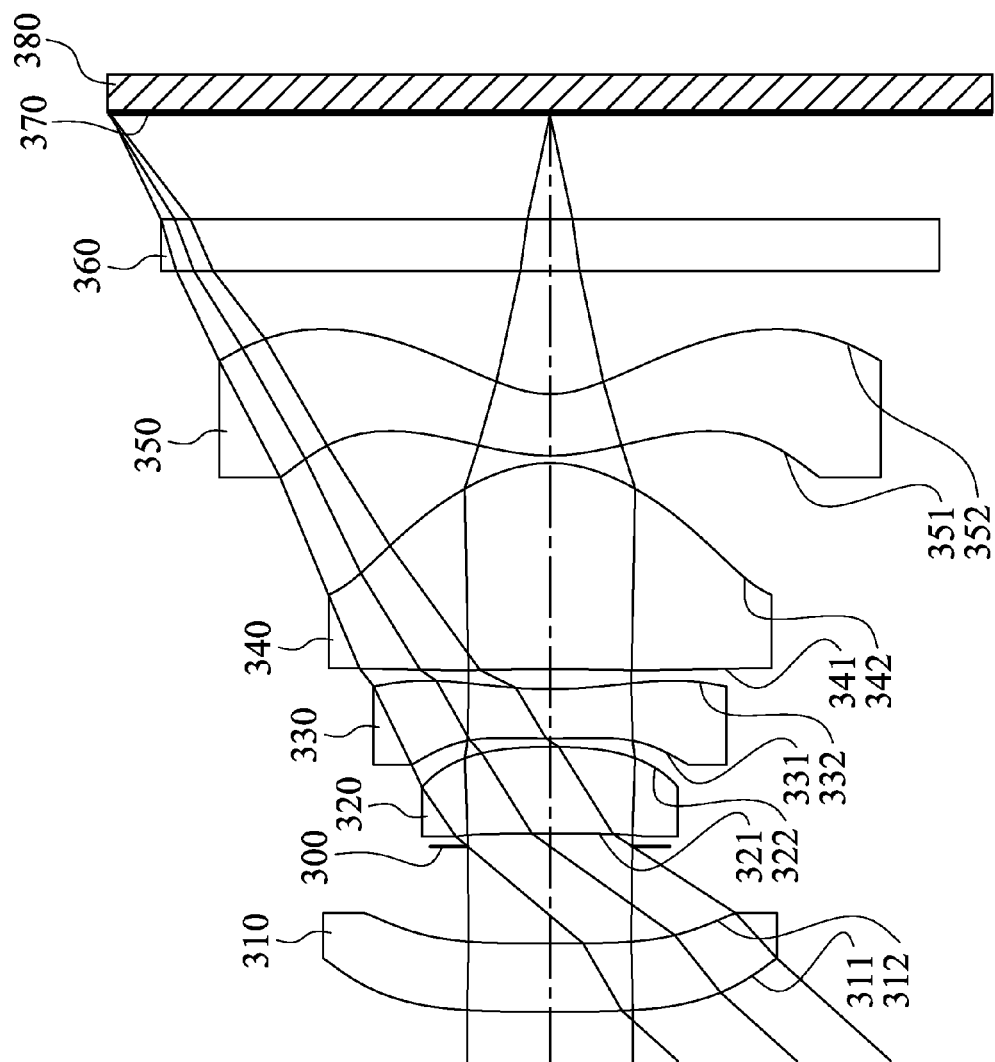
FIG. 5 is a schematic view of an image capturing device according to the 3rd embodiment of the present disclosure.
Figure 6:
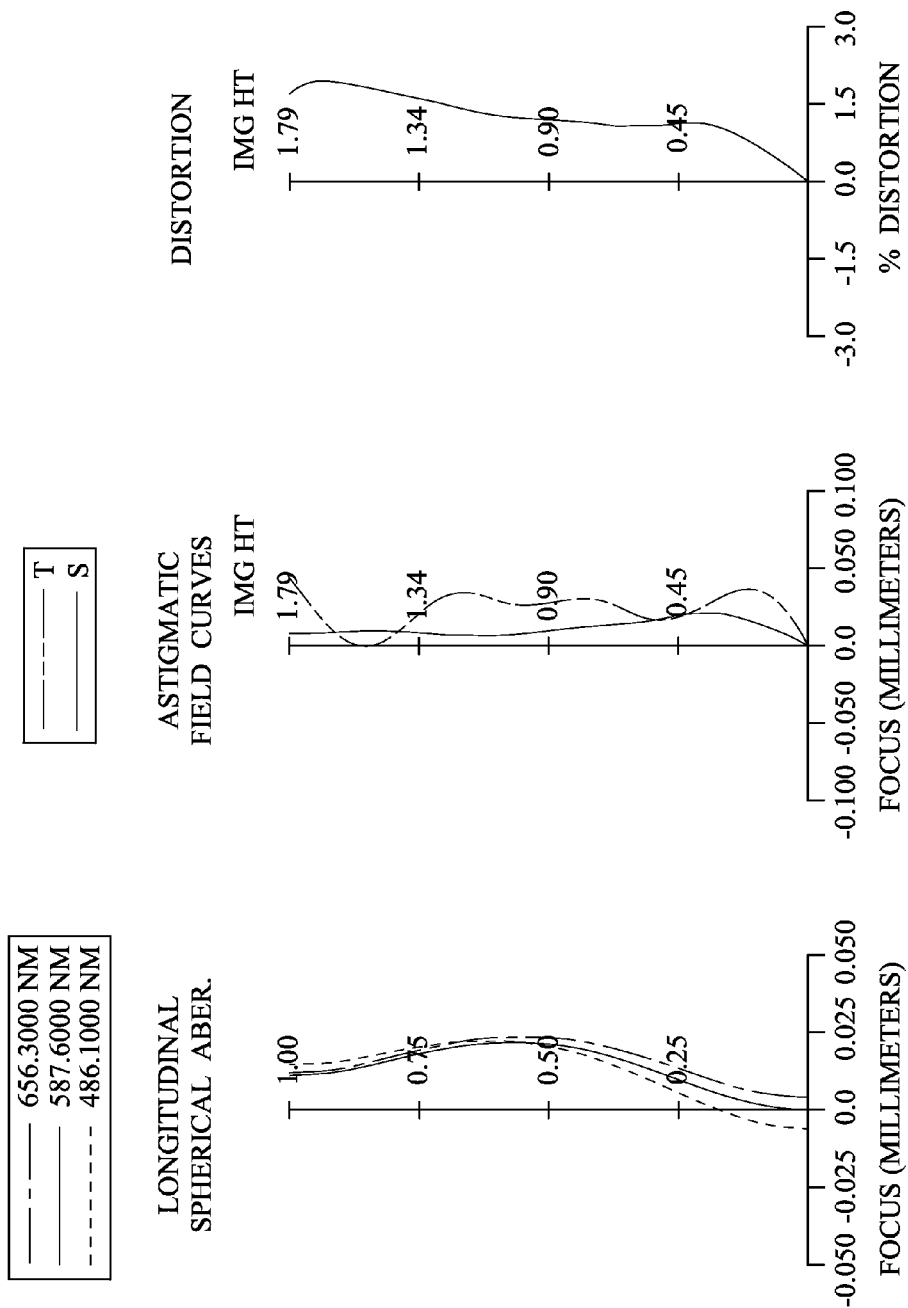
FIG. 6 shows spherical aberration curves, astigmatic field curves and a distortion curve of the image capturing device according to the 3rd embodiment.

FIG. 5 is a schematic view of an image capturing device according to the 3rd embodiment of the present disclosure. FIG. 6 shows spherical aberration curves, astigmatic field curves and a distortion curve of the image capturing device according to the 3rd embodiment. In FIG. 5, the image capturing device includes a photographing lens system (its reference numeral is omitted) and an image sensor 380. The photographing lens system includes, in order from an object side to an image side, a first lens element 310, an aperture stop 300, a second lens element 320, a third lens element 330, a fourth lens element 340, a fifth lens element 350, an IR-cut filter 360 and an image surface 370, wherein the image sensor 380 is disposed on the image surface 370 of the photographing lens system. The photographing lens system has a total of five lens elements (310-350) with refractive power, and there is an air space in a paraxial region between any two of the first lens element 310, the second lens element 320, the third lens element 330, the fourth lens element 340, and the fifth lens element 350 that are adjacent to each other.

The first lens element 310 with negative refractive power has a convex object-side surface 311 and a concave image-side surface 312. The first lens element 310 is made of plastic material, and has the object-side surface 311 and the image-side surface 312 being both aspheric.

The second lens element 320 with positive refractive power has a concave object-side surface 321 and a convex image-side surface 322. The second lens element 320 is made of plastic material, and has the object-side surface 321 and the image-side surface 322 being both aspheric.

The third lens element 330 with negative refractive power has a convex object-side surface 331 and a concave image-side surface 332. The third lens element 330 is made of plastic material, and has the object-side surface 331 and the image-side surface 332 being both aspheric. Furthermore, the image-side surface 332 of the third lens element 330 has a convex shape in an off-axial region thereof.

The fourth lens element 340 with positive refractive power has a concave object-side surface 341 and a convex image-side surface 342. The fourth lens element 340 is made of plastic material, and has the object-side surface 341 and the image-side surface 342 being both aspheric.

The fifth lens element 350 with negative refractive power has a convex object-side surface 351 and a concave image-side surface 352. The fifth lens element 350 is made of plastic material, and has the object-side surface 351 and the image-side surface 352 being both aspheric. Furthermore, the image-side surface 352 of the fifth lens element 350 has a convex shape in an off-axial region thereof.

The IR-cut filter 360 is made of glass material and located between the fifth lens element 350 and the image surface 370, and will not affect a focal length of the photographing lens system.

The detailed optical data of the 3rd embodiment are shown in Table 5 and the aspheric surface data are shown in Table 6 below.

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 1.58 | R6/R5 | 0.51 |
| Fno | 2.35 | R10/f | 0.25 |
| HFOV [deg.] | 48.0 | \|f/f1\| + \|f/f2\| + | 0.60 |

TABLE 5

3rd Embodiment
f = 1.58 mm, Fno = 2.35, HFOV = 48.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 36.462 | ASP | 0.277 | Plastic | 1.544 | 55.9 | −728.42 |
| 2 | | 33.301 | ASP | 0.394 | | | | |
| 3 | Ape. Stop | Plano | | 0.052 | | | | |
| 4 | Lens 2 | −36.618 | ASP | 0.352 | Plastic | 1.544 | 55.9 | 4.72 |
| 5 | | −2.406 | ASP | 0.034 | | | | |
| 6 | Lens 3 | 3.303 | ASP | 0.200 | Plastic | 1.607 | 26.6 | −6.03 |
| 7 | | 1.697 | ASP | 0.082 | | | | |
| 8 | Lens 4 | −6.162 | ASP | 0.836 | Plastic | 1.544 | 55.9 | 0.99 |
| 9 | | −0.520 | ASP | 0.030 | | | | |
| 10 | Lens 5 | 0.805 | ASP | 0.250 | Plastic | 1.650 | 21.4 | −1.60 |
| 11 | | 0.398 | ASP | 0.500 | | | | |
| 12 | IR-cut filter | Plano | | 0.210 | Glass | 1.517 | 64.2 | — |
| 13 | | Plano | | 0.432 | | | | |
| 14 | Image | Plano | | — | | | | |

Note:
Reference wavelength is 587.6 nm (d-line).

TABLE 6

| Aspheric Coefficients | | | | | |
|---|---|---|---|---|---|
| Surface # | 1 | 2 | 4 | 5 | 6 |
| k = | −9.0000E+01 | −1.1374E+01 | −9.0000E+01 | −2.1843E+01 | 1.8496E+01 |
| A4 = | 3.8309E−01 | 4.7248E−01 | −1.5570E−01 | −2.1609E+00 | −2.7054E+00 |
| A6 = | −2.7933E−01 | 7.8930E−01 | −1.6023E+00 | 8.6007E+00 | 8.4324E+00 |
| A8 = | 4.2121E−01 | −8.1749E+00 | 3.7347E+00 | −5.0131E+01 | −4.4357E+01 |
| A10 = | −5.5448E−01 | 3.0041E+01 | −4.7874E+01 | 1.5592E+02 | 1.3269E+02 |
| A12 = | 5.1758E−01 | −5.2745E+01 | | −2.2602E+02 | −1.5898E+02 |
| A14 = | 1.2208E−01 | 4.1238E+01 | | | 7.0505E+01 |
| A16 = | −3.9152E−01 | −1.1254E+01 | | | |

| Surface # | 7 | 8 | 9 | 10 | 11 |
|---|---|---|---|---|---|
| k = | −1.9198E+01 | 2.3834E+01 | −1.8741E+00 | −9.7261E+00 | −3.5492E+00 |
| A4 = | −2.2924E−01 | 5.1050E−01 | 3.1690E−01 | 2.1926E−02 | −4.7120E−01 |
| A6 = | −1.5870E+00 | −1.8617E+00 | −2.7037E+00 | −1.8322E+00 | 4.5931E−01 |
| A8 = | 9.8494E+00 | 7.5521E+00 | 7.6373E+00 | 4.8030E+00 | −2.7123E−01 |
| A10 = | −3.1410E+01 | −2.1509E+01 | −1.2737E+01 | −6.6325E+00 | 4.9800E−03 |
| A12 = | 4.6718E+01 | 3.0691E+01 | 1.2487E+01 | 4.9145E+00 | 8.2979E−02 |
| A14 = | −2.4655E+01 | −1.6512E+01 | −5.0205E+00 | −1.8155E+00 | −4.0457E−02 |
| A16 = | | | 2.8837E−02 | 2.6274E−01 | 6.2742E−03 |

-continued

| 3rd Embodiment | | | |
|---|---|---|---|
| V3 + V5 | 48.0 | \|f/f3\| | |
| (CT3 + CT5)/CT4 | 0.54 | \|f/f4\| + \|f/f5\| | 2.58 |
| CT4/ΣCT | 0.44 | SD11/SD52 | 0.69 |
| T12/(T23 + T34 + T45) | 3.05 | f/SD52 | 1.18 |
| SD/TD | 0.73 | ImgH/BL | 1.57 |

4th Embodiment

Figure 7:
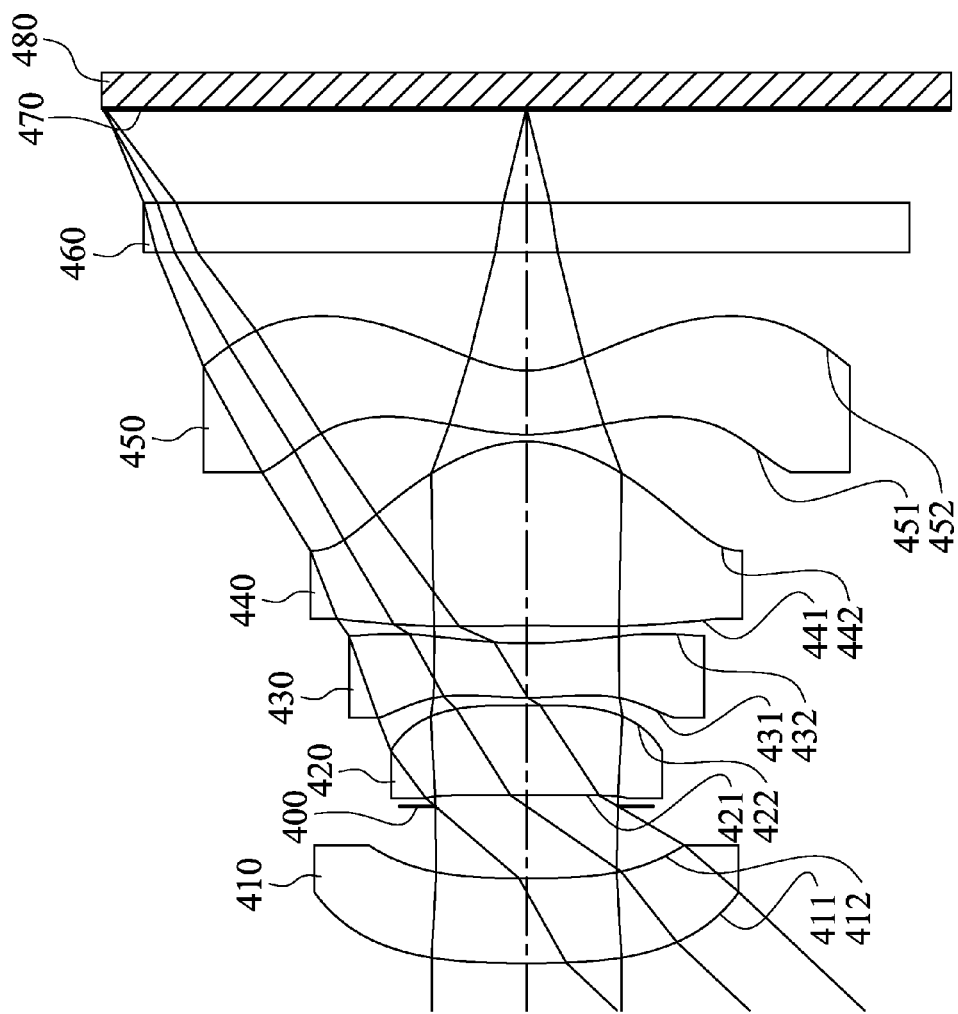
FIG. 7 is a schematic view of an image capturing device according to the 4th embodiment of the present disclosure.
Figure 8:
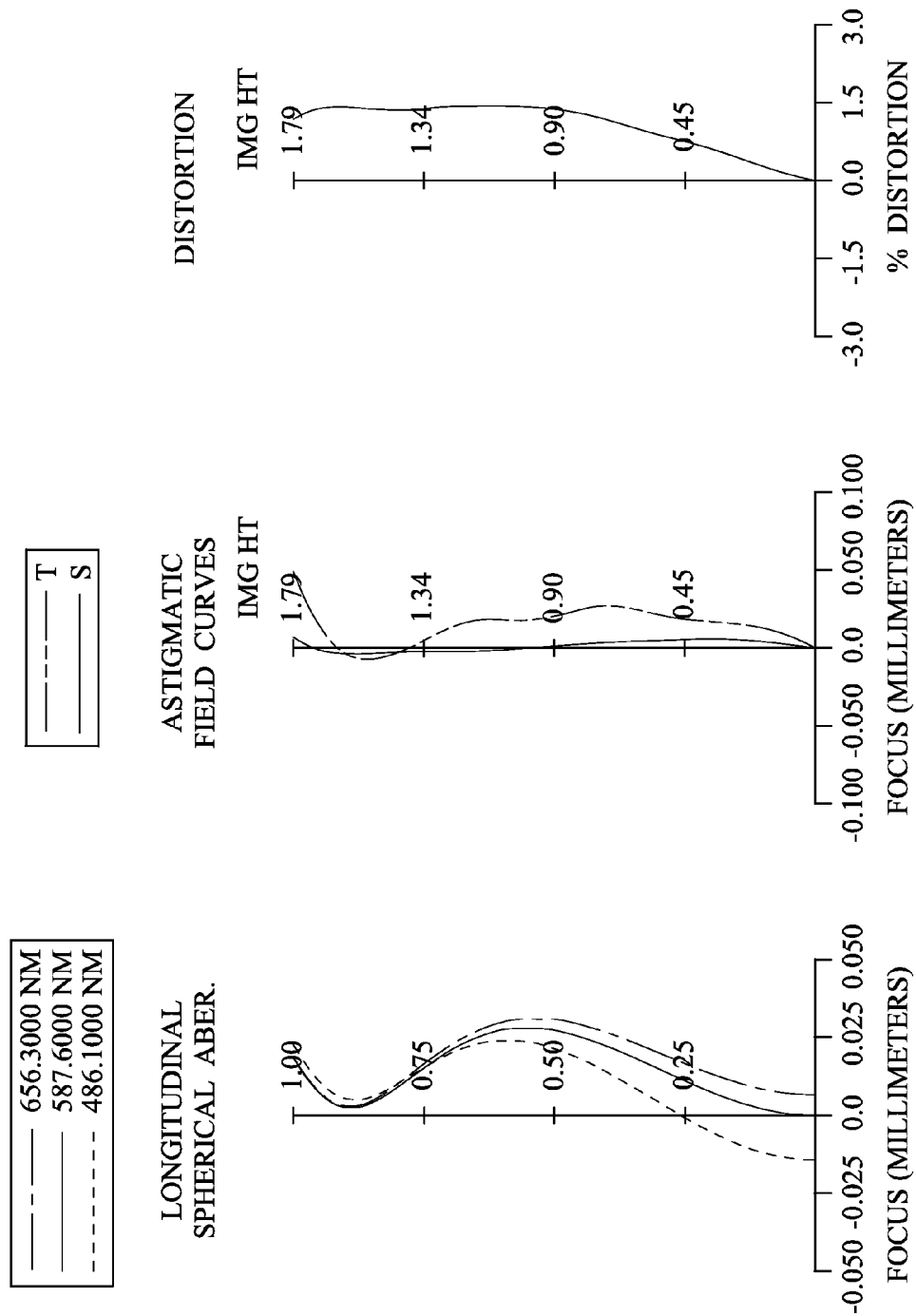
FIG. 8 shows spherical aberration curves, astigmatic field curves and a distortion curve of the image capturing device according to the 4th embodiment.

FIG. 7 is a schematic view of an image capturing device according to the 4th embodiment of the present disclosure. FIG. 8 shows spherical aberration curves, astigmatic field curves and a distortion curve of the image capturing device according to the 4th embodiment. In FIG. 7, the image capturing device includes a photographing lens system (its reference numeral is omitted) and an image sensor 480. The photographing lens system includes, in order from an object side to an image side, a first lens element 410, an aperture stop 400, a second lens element 420, a third lens element 430, a fourth lens element 440, a fifth lens element 450, an IR-cut filter 460 and an image surface 470, wherein the image sensor 480 is disposed on the image surface 470 of the photographing lens system. The photographing lens system has a total of five lens elements (410-450) with refractive power, and there is an air space in a paraxial region between any two of the first lens element 410, the second lens element 420, the third lens element 430, the fourth lens element 440, and the fifth lens element 450 that are adjacent to each other.

The first lens element 410 with positive refractive power has a convex object-side surface 411 and a concave image-side surface 412. The first lens element 410 is made of plastic material, and has the object-side surface 411 and the image-side surface 412 being both aspheric.

The second lens element 420 with positive refractive power has a convex object-side surface 421 and a concave image-side surface 422. The second lens element 420 is made of plastic material, and has the object-side surface 421 and the image-side surface 422 being both aspheric.

The third lens element 430 with positive refractive power has a convex object-side surface 431 and a concave image-side surface 432. The third lens element 430 is made of plastic material, and has the object-side surface 431 and the image-side surface 432 being both aspheric. Furthermore, the image-side surface 432 of the third lens element 430 has a convex shape in an off-axial region thereof.

The fourth lens element 440 with positive refractive power has a concave object-side surface 441 and a convex image-side surface 442. The fourth lens element 440 is made of plastic material, and has the object-side surface 441 and the image-side surface 442 being both aspheric.

The fifth lens element 450 with negative refractive power has a convex object-side surface 451 and a concave image-side surface 452. The fifth lens element 450 is made of plastic material, and has the object-side surface 451 and the image-side surface 452 being both aspheric. Furthermore, the image-side surface 452 of the fifth lens element 450 has a convex shape in an off-axial region thereof.

The IR-cut filter 460 is made of glass material and located between the fifth lens element 450 and the image surface 470, and will not affect a focal length of the photographing lens system.

The detailed optical data of the 4th embodiment are shown in Table 7 and the aspheric surface data are shown in Table 8 below.

TABLE 7

4th Embodiment
f = 1.66 mm, Fno = 2.07, HFOV = 46.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 5.101 | ASP | 0.360 | Plastic | 1.544 | 55.9 | 55.47 |
| 2 | | 5.986 | ASP | 0.305 | | | | |
| 3 | Ape. Stop | Plano | | 0.047 | | | | |
| 4 | Lens 2 | 27.942 | ASP | 0.380 | Plastic | 1.544 | 55.9 | 86.82 |
| 5 | | 68.064 | ASP | 0.033 | | | | |
| 6 | Lens 3 | 1.762 | ASP | 0.230 | Plastic | 1.639 | 23.5 | 16.80 |
| 7 | | 2.001 | ASP | 0.074 | | | | |
| 8 | Lens 4 | −6.880 | ASP | 0.780 | Plastic | 1.544 | 55.9 | 1.01 |
| 9 | | −0.527 | ASP | 0.030 | | | | |
| 10 | Lens 5 | 0.960 | ASP | 0.270 | Plastic | 1.639 | 23.5 | −1.53 |
| 11 | | 0.432 | ASP | 0.500 | | | | |
| 12 | IR-cut filter | Plano | | 0.210 | Glass | 1.517 | 64.2 | — |
| 13 | | Plano | | 0.397 | | | | |
| 14 | Image | Plano | | — | | | | |

Note:
Reference wavelength is 587.6 nm (d-line).

TABLE 8

Aspheric Coefficients

| Surface # | 1 | 2 | 4 | 5 | 6 |
|---|---|---|---|---|---|
| k = | −1.0699E+00 | −2.8871E+01 | −9.0000E+01 | −9.0000E+01 | 3.5862E+00 |
| A4 = | 3.7069E−01 | 8.1185E−01 | −7.3995E−02 | −2.7051E+00 | −2.7872E+00 |
| A6 = | −3.9304E−01 | −2.1252E+00 | −2.5565E+00 | 1.2448E+01 | 9.2972E+00 |
| A8 = | 9.2317E−01 | 8.0748E+00 | 1.8767E+01 | −6.4586E+01 | −4.4462E+01 |

TABLE 8-continued

| Aspheric Coefficients | | | | | |
|---|---|---|---|---|---|
| A10 = | −1.2306E+00 | −1.5135E+01 | −9.4448E+01 | 1.8093E+02 | 1.2685E+02 |
| A12 = | 1.1439E+00 | 1.1567E+01 | | −2.2602E+02 | −1.5898E+02 |
| A14 = | −4.3543E−01 | −3.0412E+00 | | | 7.0505E+01 |

| Surface # | 7 | 8 | 9 | 10 | 11 |
|---|---|---|---|---|---|
| k = | −2.8802E+00 | 2.3684E+01 | −2.0357E+00 | −1.1952E+01 | −3.8421E+00 |
| A4 = | −2.5318E−01 | 5.6889E−01 | 3.0666E−01 | −1.7088E−02 | −4.3891E−01 |
| A6 = | −1.6501E+00 | −1.8595E+00 | −2.6827E+00 | −1.8572E+00 | 2.8964E−01 |
| A8 = | 1.0308E+01 | 7.5351E+00 | 7.6960E+00 | 4.8009E+00 | 2.2389E−02 |
| A10 = | −3.1942E+01 | −2.1489E+01 | −1.2635E+01 | −6.6202E+00 | −2.9739E−01 |
| A12 = | 4.6718E+01 | 3.0340E+01 | 1.2589E+01 | 4.9355E+00 | 2.7277E−01 |
| A14 = | −2.4655E+01 | −1.6092E+01 | −5.1986E+00 | −1.8013E+00 | −1.0724E−01 |
| A16 = | | | | 2.4763E−01 | 1.6202E−02 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 1.66 | R6/R5 | 1.14 |
| Fno | 2.07 | R10/f | 0.26 |
| HFOV [deg.] | 46.7 | |f/f1| + |f/f2| + |f/f3| | 0.15 |
| V3 + V5 | 47.0 | |f/f4| + |f/f5| | 2.73 |
| (CT3 + CT5)/CT4 | 0.64 | SD11/SD52 | 0.66 |
| CT4/ΣCT | 0.39 | f/SD52 | 1.21 |
| T12/(T23 + T34 + T45) | 2.57 | ImgH/BL | 1.62 |
| SD/TD | 0.73 | | |

5th Embodiment

Figure 9:
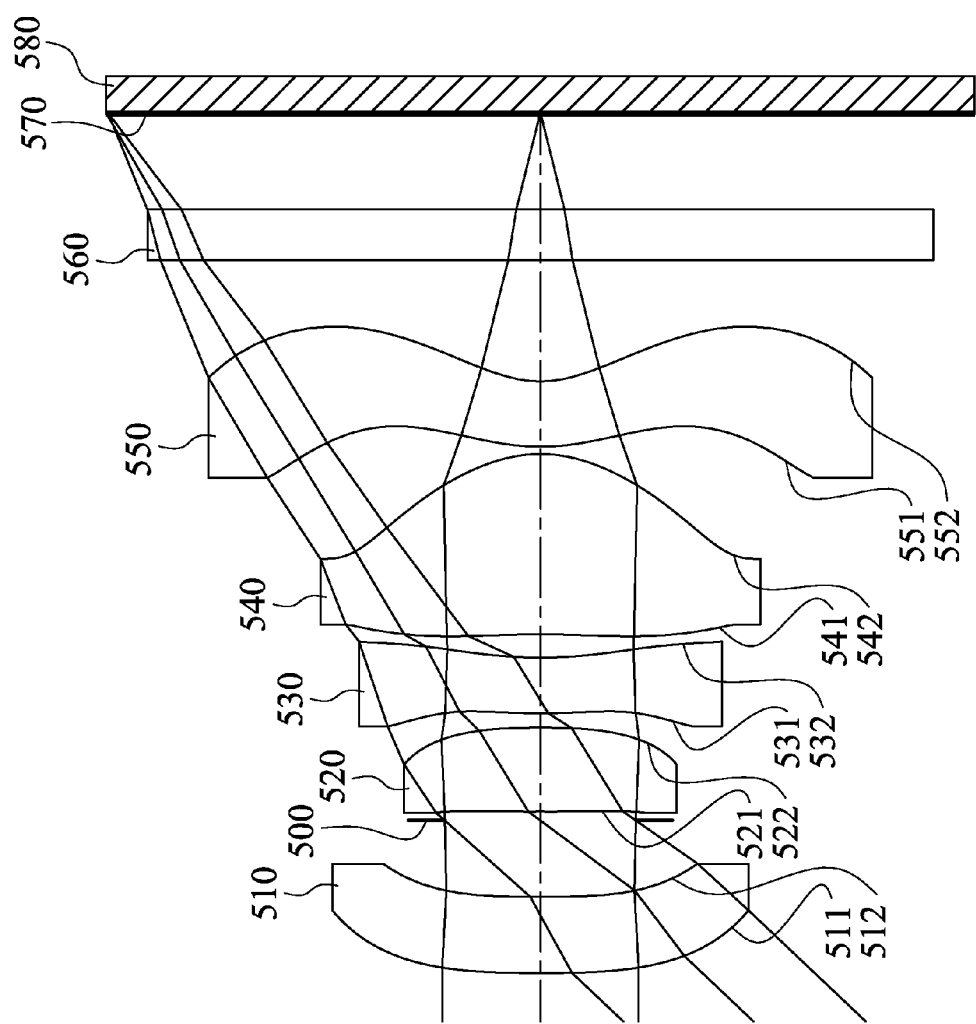
FIG. 9 is a schematic view of an image capturing device according to the 5th embodiment of the present disclosure.
Figure 10:
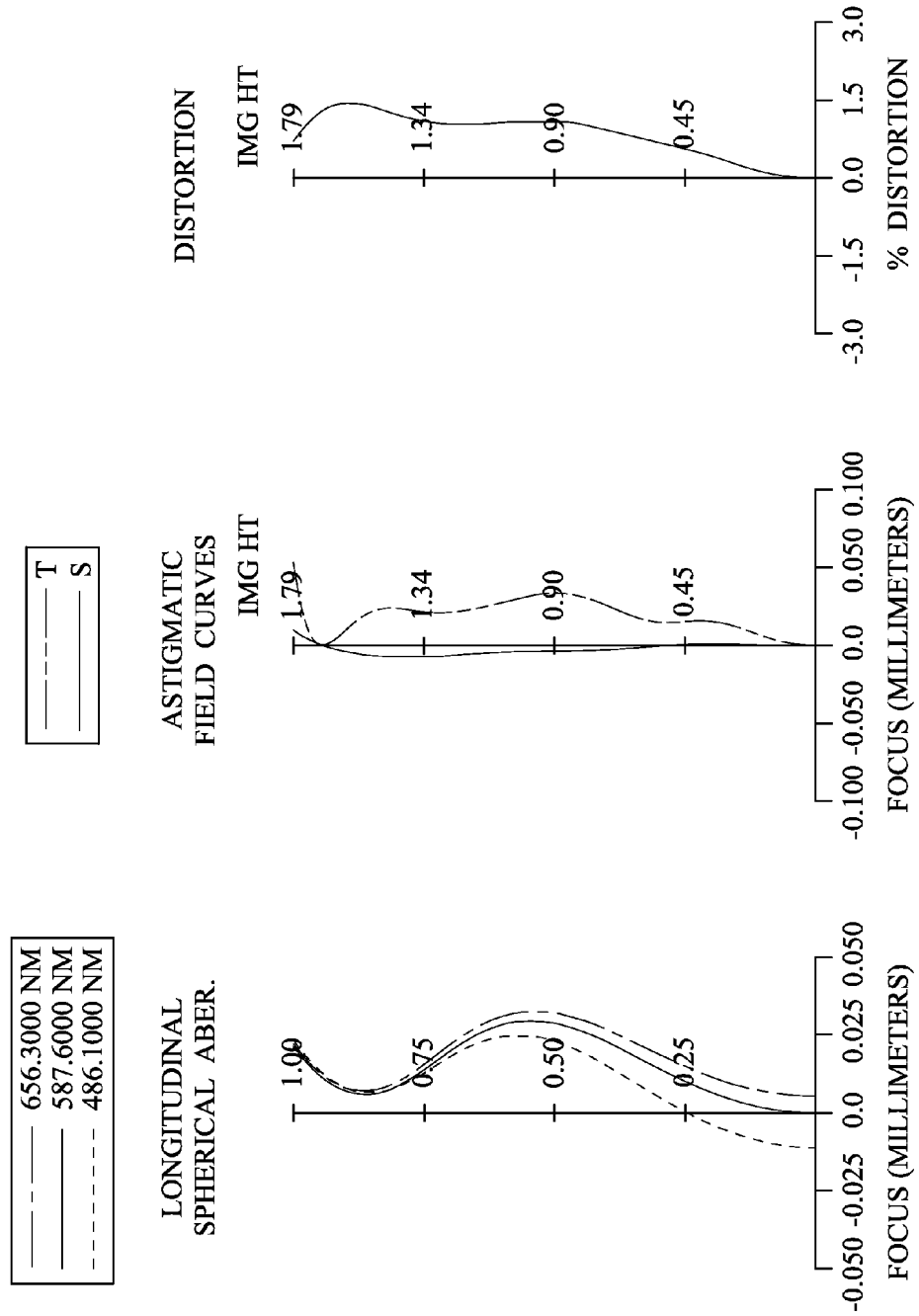
FIG. 10 shows spherical aberration curves, astigmatic field curves and a distortion curve of the image capturing device according to the 5th embodiment.

FIG. 9 is a schematic view of an image capturing device according to the 5th embodiment of the present disclosure. FIG. 10 shows spherical aberration curves, astigmatic field curves and a distortion curve of the image capturing device according to the 5th embodiment. In FIG. 9, the image capturing device includes a photographing lens system (its reference numeral is omitted) and an image sensor 580. The photographing lens system includes, in order from an object side to an image side, a first lens element 510, an aperture stop 500, a second lens element 520, a third lens element 530, a fourth lens element 540, a fifth lens element 550, an IR-cut filter 560 and an image surface 570, wherein the image sensor 580 is disposed on the image surface 570 of the photographing lens system. The photographing lens system has a total of five lens elements (510-550) with refractive power, and there is an air space in a paraxial region between any two of the first lens element 510, the second lens element 520, the third lens element 530, the fourth lens element 540, and the fifth lens element 550 that are adjacent to each other.

The first lens element 510 with positive refractive power has a convex object-side surface 511 and a concave image-side surface 512. The first lens element 510 is made of plastic material, and has the object-side surface 511 and the image-side surface 512 being both aspheric.

The second lens element 520 with positive refractive power has a convex object-side surface 521 and a convex image-side surface 522. The second lens element 520 is made of plastic material, and has the object-side surface 521 and the image-side surface 522 being both aspheric.

The third lens element 530 with negative refractive power has a convex object-side surface 531 and a concave image-side surface 532. The third lens element 530 is made of plastic material, and has the object-side surface 531 and the image-side surface 532 being both aspheric. Furthermore, the image-side surface 532 of the third lens element 530 has a convex shape in an off-axial region thereof.

The fourth lens element 540 with positive refractive power has a concave object-side surface 541 and a convex image-side surface 542. The fourth lens element 540 is made of plastic material, and has the object-side surface 541 and the image-side surface 542 being both aspheric.

The fifth lens element 550 with negative refractive power has a convex object-side surface 551 and a concave image-side surface 552. The fifth lens element 550 is made of plastic material, and has the object-side surface 551 and the image-side surface 552 being both aspheric. Furthermore, the image-side surface 552 of the fifth lens element 550 has a convex shape in an off-axial region thereof.

The IR-cut filter 560 is made of glass material and located between the fifth lens element 550 and the image surface 570, and will not affect a focal length of the photographing lens system.

The detailed optical data of the 5th embodiment are shown in Table 9 and the aspheric surface data are shown in Table 10 below.

TABLE 9

5th Embodiment
f = 1.68 mm, Fno = 2.07, HFOV = 46.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 6.263 ASP | 0.315 | Plastic | 1.544 | 55.9 | 56.06 |

TABLE 9-continued

5th Embodiment
f = 1.68 mm, Fno = 2.07, HFOV = 46.5 deg.

| Surface # | | Curvature Radius | | Thickness | Material | Index | Abbe # | Focal Length |
|---|---|---|---|---|---|---|---|---|
| 2 | | 7.741 | ASP | 0.316 | | | | |
| 3 | Ape. Stop | Plano | | 0.037 | | | | |
| 4 | Lens 2 | 14.446 | ASP | 0.347 | Plastic | 1.544 | 55.9 | 5.13 |
| 5 | | −3.430 | ASP | 0.059 | | | | |
| 6 | Lens 3 | 2.587 | ASP | 0.230 | Plastic | 1.639 | 23.5 | −14.74 |
| 7 | | 1.959 | ASP | 0.097 | | | | |
| 8 | Lens 4 | −3.139 | ASP | 0.745 | Plastic | 1.544 | 55.9 | 1.11 |
| 9 | | −0.549 | ASP | 0.030 | | | | |
| 10 | Lens 5 | 0.908 | ASP | 0.270 | Plastic | 1.639 | 23.5 | −1.78 |
| 11 | | 0.446 | ASP | 0.500 | | | | |
| 12 | IR-cut filter | Plano | | 0.210 | Glass | 1.517 | 64.2 | — |
| 13 | | Plano | | 0.397 | | | | |
| 14 | Image | Plano | | — | | | | |

Note:
Reference wavelength is 587.6 nm (d-line).

TABLE 10

Aspheric Coefficients

| Surface # | 1 | 2 | 4 | 5 | 6 |
|---|---|---|---|---|---|
| k = | −6.0600E+01 | −5.0623E+01 | 4.7119E+01 | 1.9885E+01 | −3.9903E+00 |
| A4 = | 4.3050E−01 | 8.9655E−01 | 8.7367E−03 | −8.2850E−01 | −9.8873E−01 |
| A6 = | −3.0228E−01 | −2.3229E+00 | −3.1596E+00 | −1.1958E+00 | −3.5253E+00 |
| A8 = | 3.2763E−01 | 8.4330E+00 | 3.1870E+01 | 1.0991E+01 | 2.1453E+01 |
| A10 = | 1.8369E−01 | −1.2744E+01 | −1.8595E+02 | −2.5432E+01 | −4.8693E+01 |
| A12 = | −2.4221E−01 | 5.5004E+00 | 2.8605E+02 | −5.6700E+00 | 6.7323E+01 |
| A14 = | | | | | −4.3526E+01 |

| Surface # | 7 | 8 | 9 | 10 | 11 |
|---|---|---|---|---|---|
| k = | −2.7470E+00 | −5.9824E+00 | −1.7286E+00 | −4.1271E+00 | −3.6422E+00 |
| A4 = | 3.0845E−01 | 1.0701E+00 | 5.6223E−01 | −7.0008E−01 | −4.5533E−01 |
| A6 = | −5.4060E+00 | −4.1898E+00 | −4.4709E+00 | 7.0309E−01 | 2.5433E−01 |
| A8 = | 2.2706E+01 | 1.2431E+01 | 1.7151E+01 | −1.6210E+00 | 3.7438E−02 |
| A10 = | −5.0592E+01 | −1.9957E+01 | −4.2715E+01 | 3.1313E+00 | −2.1469E−01 |
| A12 = | 5.8211E+01 | 1.0640E+01 | 6.5739E+01 | −3.2604E+00 | 1.8124E−01 |
| A14 = | −2.6482E+01 | 9.6777E+00 | −5.1906E+01 | 1.6950E+00 | −7.1181E−02 |
| A16 = | | −1.0846E+01 | 1.5835E+01 | −3.4417E−01 | 1.1040E−02 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 1.68 | R6/R5 | 0.76 |
| Fno | 2.07 | R10/f | 0.27 |
| HFOV [deg.] | 46.5 | |f/f1| + |f/f2| + |f/f3| | 0.47 |
| V3 + V5 | 47.0 | |f/f4| + |f/f5| | 2.46 |
| (CT3 + CT5)/CT4 | 0.67 | SD11/SD52 | 0.63 |
| CT4/ΣCT | 0.39 | f/SD52 | 1.23 |
| T12/(T23 + T34 + T45) | 1.90 | ImgH/BL | 1.62 |
| SD/TD | 0.74 | | |

6th Embodiment

Figure 11:
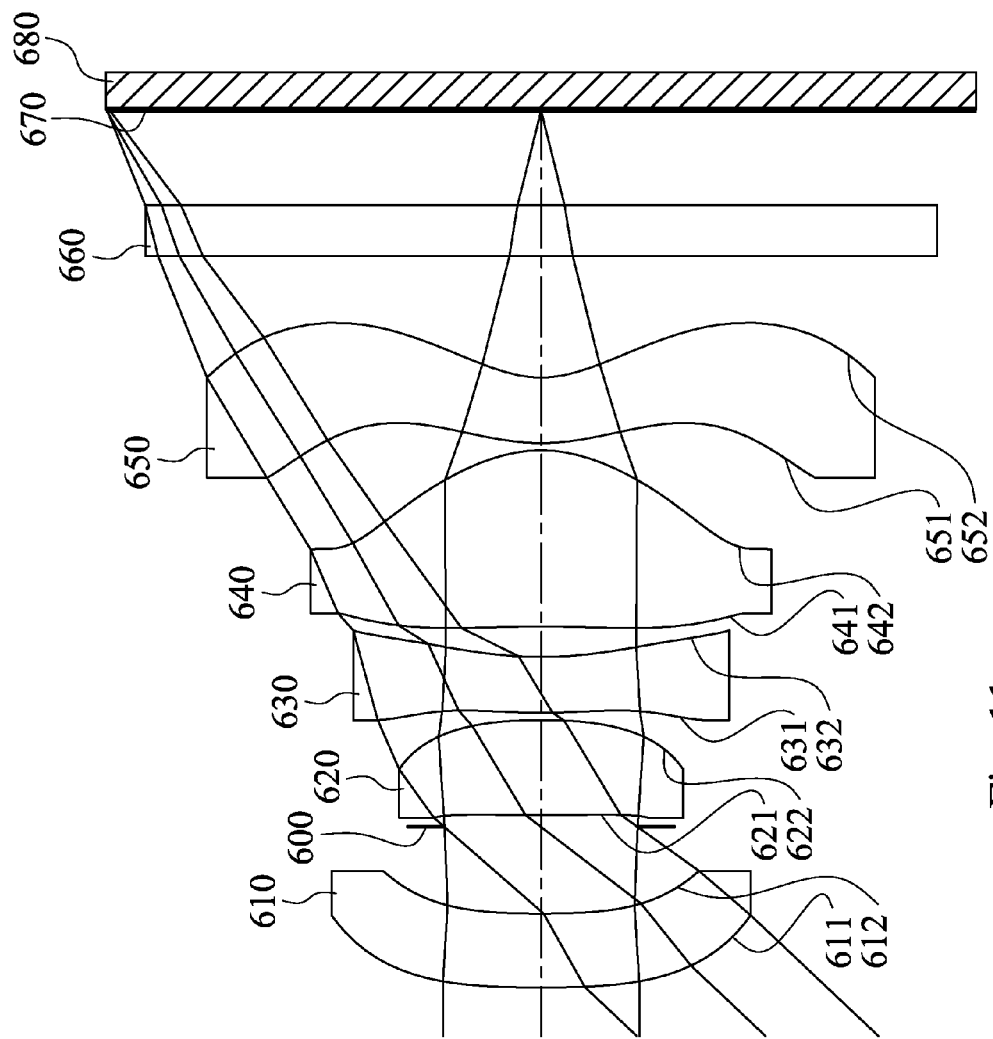
FIG. 11 is a schematic view of an image capturing device according to the 6th embodiment of the present disclosure.
Figure 12:
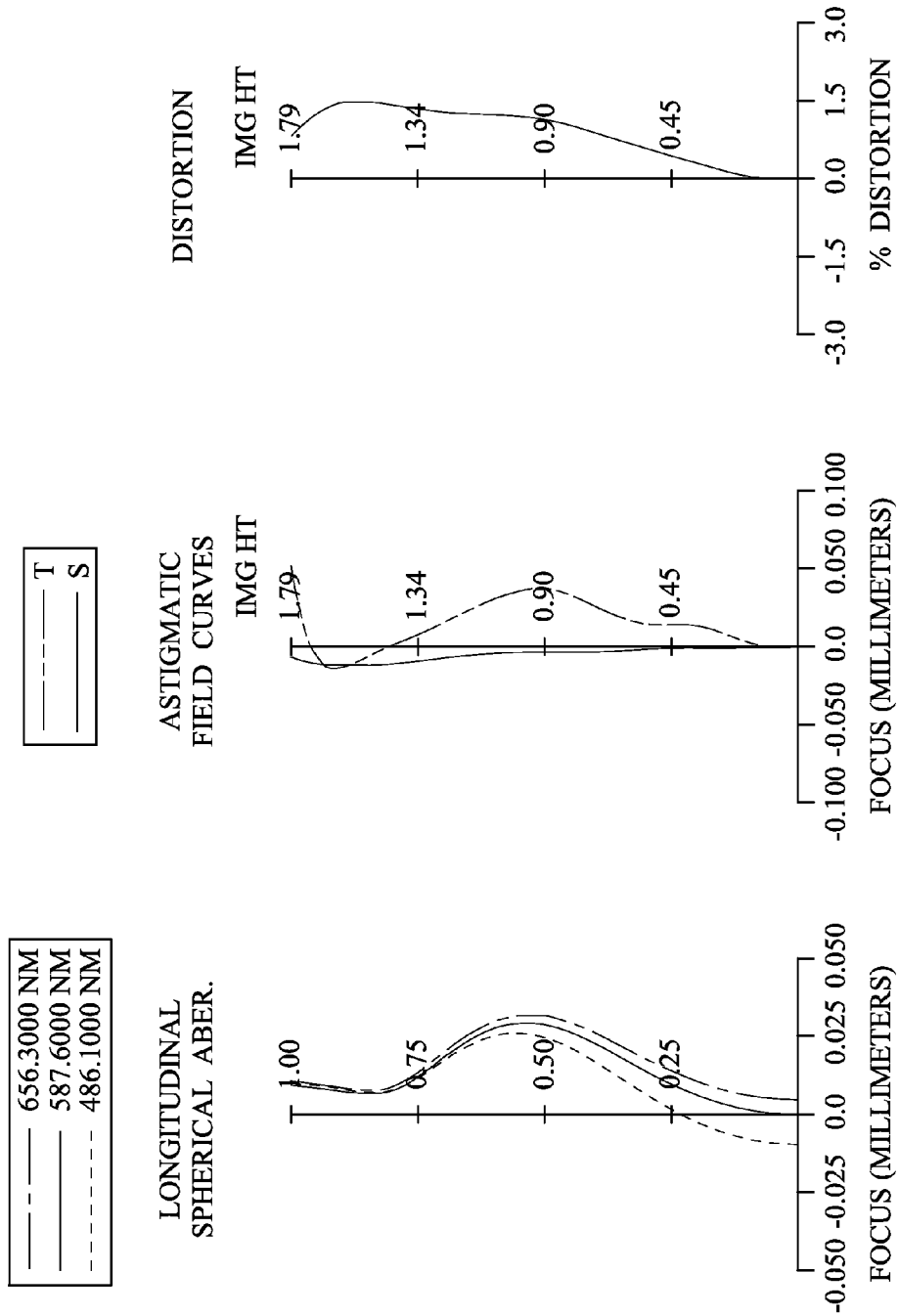
FIG. 12 shows spherical aberration curves, astigmatic field curves and a distortion curve of the image capturing device according to the 6th embodiment.

FIG. 11 is a schematic view of an image capturing device according to the 6th embodiment of the present disclosure. FIG. 12 shows spherical aberration curves, astigmatic field curves and a distortion curve of the image capturing device according to the 6th embodiment. In FIG. 11, the image capturing device includes a photographing lens system (its reference numeral is omitted) and an image sensor 680. The photographing lens system includes, in order from an object side to an image side, a first lens element 610, an aperture stop 600, a second lens element 620, a third lens element 630, a fourth lens element 640, a fifth lens element 650, an IR-cut filter 660 and an image surface 670, wherein the image sensor 680 is disposed on the image surface 670 of the photographing lens system. The photographing lens system has a total of five lens elements (610-650) with refractive power, and there is an air space in a paraxial region between any two of the first lens element 610, the second lens element 620, the third lens element 630, the fourth lens element 640, and the fifth lens element 650 that are adjacent to each other.

The first lens element 610 with negative refractive power has a convex object-side surface 611 and a concave image-side surface 612. The first lens element 610 is made of plastic material, and has the object-side surface 611 and the image-side surface 612 being both aspheric.

The second lens element 620 with positive refractive power has a convex object-side surface 621 and a convex image-side surface 622. The second lens element 620 is made of plastic material, and has the object-side surface 621 and the image-side surface 622 being both aspheric.

The third lens element 630 with negative refractive power has a convex object-side surface 631 and a concave image-side surface 632. The third lens element 630 is made of plastic material, and has the object-side surface 631 and the image-side surface 632 being both aspheric. Furthermore, the image-side surface 632 of the third lens element 630 has a convex shape in an off-axial region thereof.

The fourth lens element 640 with positive refractive power has a concave object-side surface 641 and a convex image-side surface 642. The fourth lens element 640 is made of plastic material, and has the object-side surface 641 and the image-side surface 642 being both aspheric.

The fifth lens element 650 with negative refractive power has a convex object-side surface 651 and a concave image-side surface 652. The fifth lens element 650 is made of plastic material, and has the object-side surface 651 and the image-side surface 652 being both aspheric. Furthermore, the image-side surface 652 of the fifth lens element 650 has a convex shape in an off-axial region thereof.

The IR-cut filter 660 is made of glass material and located between the fifth lens element 650 and the image surface 670, and will not affect a focal length of the photographing lens system.

The detailed optical data of the 6th embodiment are shown in Table 11 and the aspheric surface data are shown in Table 12 below.

TABLE 11

6th Embodiment
$f = 1.67$ mm, Fno = 2.07, HFOV = 46.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 5.501 | ASP | 0.305 | Plastic | 1.544 | 55.9 | −37.44 |
| 2 | | 4.247 | ASP | 0.357 | | | | |
| 3 | Ape. Stop | Plano | | 0.049 | | | | |
| 4 | Lens 2 | 12.889 | ASP | 0.392 | Plastic | 1.544 | 55.9 | 3.66 |
| 5 | | −2.334 | ASP | 0.030 | | | | |
| 6 | Lens 3 | 2.544 | ASP | 0.230 | Plastic | 1.639 | 23.5 | −9.50 |
| 7 | | 1.729 | ASP | 0.126 | | | | |
| 8 | Lens 4 | −3.891 | ASP | 0.726 | Plastic | 1.544 | 55.9 | 1.13 |
| 9 | | −0.566 | ASP | 0.030 | | | | |
| 10 | Lens 5 | 0.908 | ASP | 0.270 | Plastic | 1.639 | 23.5 | −1.77 |
| 11 | | 0.445 | ASP | 0.500 | | | | |
| 12 | IR-cut filter | Plano | | 0.210 | Glass | 1.517 | 64.2 | — |
| 13 | | Plano | | 0.394 | | | | |
| 14 | Image | Plano | | — | | | | |

Note:
Reference wavelength is 587.6 nm (d-line).

TABLE 12

Aspheric Coefficients

| Surface # | 1 | 2 | 4 | 5 | 6 |
|---|---|---|---|---|---|
| k = | −1.5843E+01 | −2.3059E+00 | −8.6960E+01 | 9.2483E+00 | −8.7827E−01 |
| A4 = | 4.7296E−01 | 9.6548E−01 | −1.1651E−01 | −1.0638E+00 | −1.0307E+00 |
| A6 = | −4.2834E−01 | −2.5542E+00 | −2.9956E+00 | 1.4648E+00 | −1.7642E+00 |
| A8 = | 6.7234E−01 | 9.7255E+00 | 3.5143E+01 | 3.4927E+00 | 2.4839E+01 |
| A10 = | −2.5631E−01 | −1.4882E+01 | −2.3720E+02 | −2.8962E+01 | −1.0007E+02 |
| A12 = | 1.4683E−02 | 6.4650E+00 | 4.4466E+02 | 2.6452E+01 | 1.9269E+02 |
| A14 = | | | | | −1.3945E+02 |

| Surface # | 7 | 8 | 9 | 10 | 11 |
|---|---|---|---|---|---|
| k = | −2.8682E+00 | −8.4970E+00 | −1.7188E+00 | −4.1271E+00 | −3.6422E+00 |
| A4 = | 2.3533E−01 | 8.5182E−01 | 6.3559E−01 | −7.1649E−01 | −4.6492E−01 |
| A6 = | −4.4161E+00 | −3.0427E+00 | −4.2743E+00 | 7.6299E−01 | 2.9013E−01 |
| A8 = | 1.9924E+01 | 7.4390E+00 | 1.5593E+01 | −1.7875E+00 | −3.1367E−02 |
| A10 = | −4.7259E+01 | −5.8261E+00 | −3.6957E+01 | 3.4315E+00 | −1.3503E−01 |
| A12 = | 5.7534E+01 | −1.1151E+01 | 5.4413E+01 | −3.6370E+00 | 1.2348E−01 |
| A14 = | −2.7595E+01 | 2.5711E+01 | −4.1420E+01 | 1.9571E+00 | −4.8558E−02 |
| A16 = | | −1.4731E+01 | 1.2216E+01 | −4.1599E−01 | 7.4909E−03 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 1.67 | R6/R5 | 0.68 |
| Fno | 2.07 | R10/f | 0.27 |
| HFOV [deg.] | 46.6 | $\|f/f1\| + \|f/f2\| + \|f/f3\|$ | 0.68 |
| V3 + V5 | 47.0 | $\|f/f4\| + \|f/f5\|$ | 2.42 |
| (CT3 + CT5)/CT4 | 0.69 | SD11/SD52 | 0.63 |
| CT4/ΣCT | 0.38 | f/SD52 | 1.21 |
| T12/(T23 + T34 + T45) | 2.18 | ImgH/BL | 1.62 |
| SD/TD | 0.74 | | |

7th Embodiment

Figure 13:
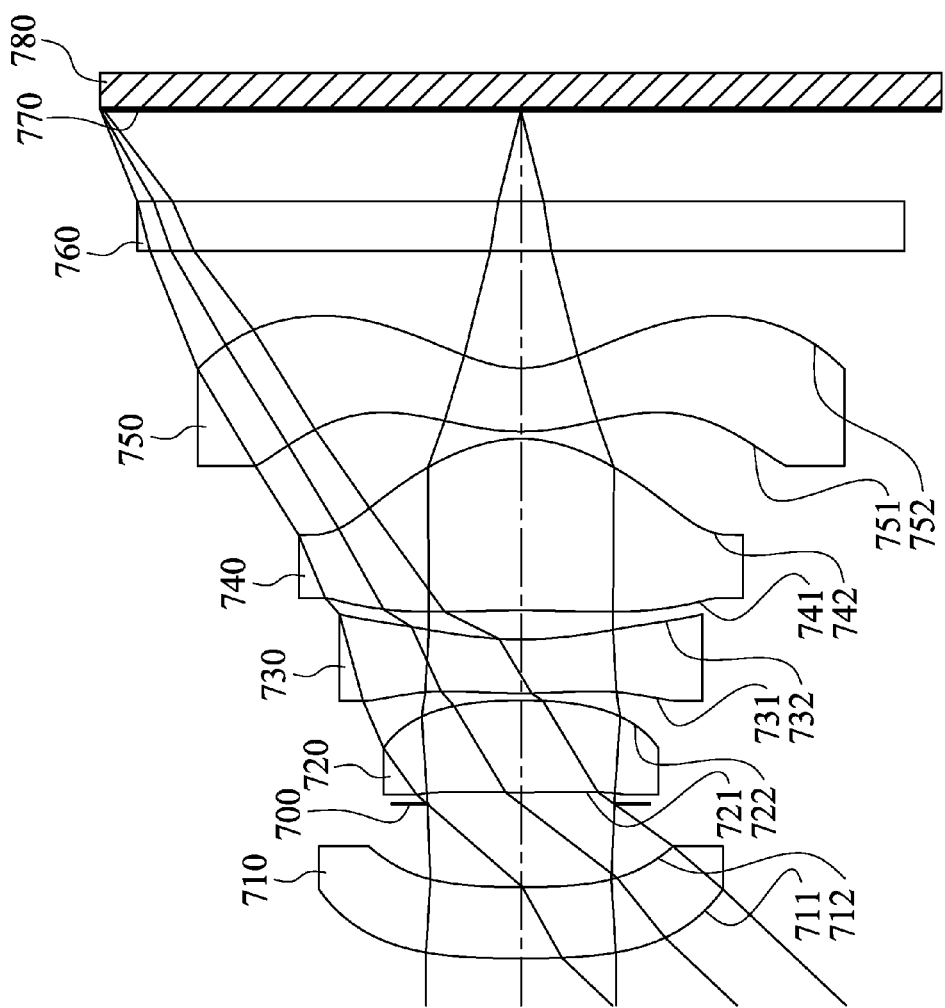
FIG. 13 is a schematic view of an image capturing device according to the 7th embodiment of the present disclosure.
Figure 14:
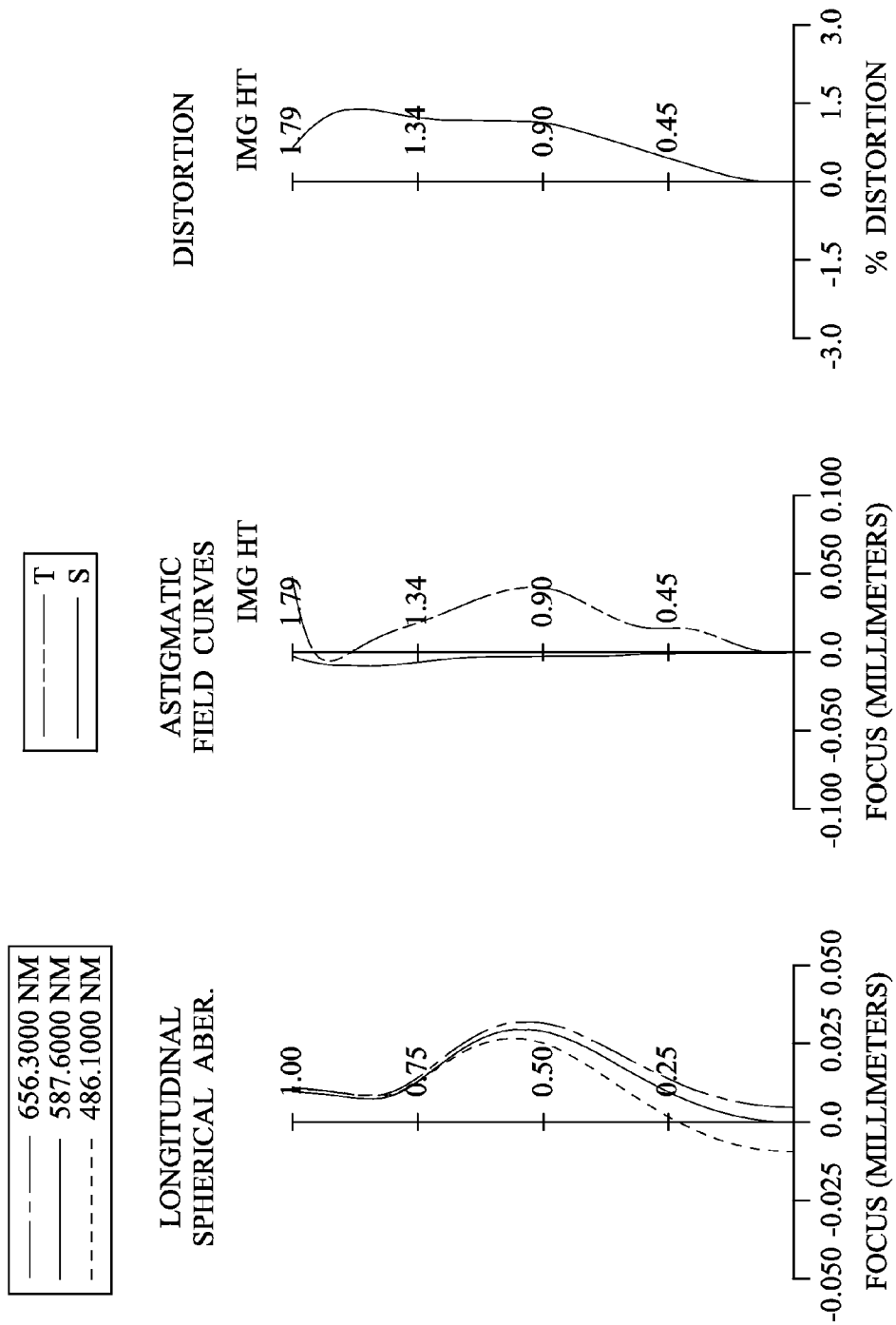
FIG. 14 shows spherical aberration curves, astigmatic field curves and a distortion curve of the image capturing device according to the 7th embodiment.

FIG. 13 is a schematic view of an image capturing device according to the 7th embodiment of the present disclosure. FIG. 14 shows spherical aberration curves, astigmatic field curves and a distortion curve of the image capturing device according to the 7th embodiment. In FIG. 13, the image capturing device includes a photographing lens system (its reference numeral is omitted) and an image sensor 780. The photographing lens system includes, in order from an object side to an image side, a first lens element 710, an aperture stop 700, a second lens element 720, a third lens element 730, a fourth lens element 740, a fifth lens element 750, an IR-cut filter 760 and an image surface 770, wherein the image sensor 780 is disposed on the image surface 770 of the photographing lens system. The photographing lens system has a total of five lens elements (710-750) with refractive power, and there is an air space in a paraxial region between any two of the first lens element 710, the second lens element 720, the third lens element 730, the fourth lens element 740, and the fifth lens element 750 that are adjacent to each other.

The first lens element 710 with negative refractive power has a convex object-side surface 711 and a concave image-side surface 712. The first lens element 710 is made of plastic material, and has the object-side surface 711 and the image-side surface 712 being both aspheric.

The second lens element 720 with positive refractive power has a convex object-side surface 721 and a convex image-side surface 722. The second lens element 720 is made of plastic material, and has the object-side surface 721 and the image-side surface 722 being both aspheric.

The third lens element 730 with negative refractive power has a convex object-side surface 731 and a concave image-side surface 732. The third lens element 730 is made of plastic material, and has the object-side surface 731 and the image-side surface 732 being both aspheric. Furthermore, the image-side surface 732 of the third lens element 730 has a convex shape in an off-axial region thereof.

The fourth lens element 740 with positive refractive power has a concave object-side surface 741 and a convex image-side surface 742. The fourth lens element 740 is made of plastic material, and has the object-side surface 741 and the image-side surface 742 being both aspheric.

The fifth lens element 750 with negative refractive power has a convex object-side surface 751 and a concave image-side surface 752. The fifth lens element 750 is made of plastic material, and has the object-side surface 751 and the image-side surface 752 being both aspheric. Furthermore, the image-side surface 752 of the fifth lens element 750 has a convex shape in an off-axial region thereof.

The IR-cut filter 760 is made of glass material and located between the fifth lens element 750 and the image surface 770, and will not affect a focal length of the photographing lens system.

The detailed optical data of the 7th embodiment are shown in Table 13 and the aspheric surface data are shown in Table 14 below.

TABLE 13

7th Embodiment
f = 1.67 mm, Fno = 2.07, HFOV = 46.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 5.668 | ASP | 0.304 | Plastic | 1.544 | 55.9 | −38.76 |
| 2 | | 4.383 | ASP | 0.354 | | | | |
| 3 | Ape. Stop | Plano | | 0.050 | | | | |
| 4 | Lens 2 | 12.740 | ASP | 0.392 | Plastic | 1.544 | 55.9 | 3.69 |
| 5 | | −2.356 | ASP | 0.030 | | | | |
| 6 | Lens 3 | 2.518 | ASP | 0.230 | Plastic | 1.639 | 23.5 | −9.44 |
| 7 | | 1.713 | ASP | 0.124 | | | | |
| 8 | Lens 4 | −4.041 | ASP | 0.732 | Plastic | 1.544 | 55.9 | 1.13 |
| 9 | | −0.566 | ASP | 0.030 | | | | |
| 10 | Lens 5 | 0.914 | ASP | 0.270 | Plastic | 1.639 | 23.5 | −1.75 |
| 11 | | 0.445 | ASP | 0.500 | | | | |
| 12 | IR-cut filter | Plano | | 0.210 | Glass | 1.517 | 64.2 | — |
| 13 | | Plano | | 0.394 | | | | |
| 14 | Image | Plano | | — | | | | |

Note:
Reference wavelength is 587.6 nm (d-line).

TABLE 14

Aspheric Coefficients

| Surface # | 1 | 2 | 4 | 5 | 6 |
|---|---|---|---|---|---|
| k = | −1.5073E+01 | 1.1637E+01 | 3.0998E+01 | 1.0330E+01 | −3.5762E+00 |
| A4 = | 4.7630E−01 | 9.5819E−01 | −1.0157E−01 | −1.0781E+00 | −1.0518E+00 |
| A6 = | −4.3915E−01 | −2.6275E+00 | −3.1480E+00 | 1.5465E+00 | −1.6845E+00 |
| A8 = | 6.8975E−01 | 9.9575E+00 | 3.6055E+01 | 3.5003E+00 | 2.4828E+01 |
| A10 = | −2.6464E−01 | −1.5109E+01 | −2.3885E+02 | −2.8964E+01 | −1.0018E+02 |
| A12 = | 1.7794E−02 | 6.5130E+00 | 4.4466E+02 | 2.6452E+01 | 1.9271E+02 |
| A14 = | | | | | −1.3934E+02 |

| Surface # | 7 | 8 | 9 | 10 | 11 |
|---|---|---|---|---|---|
| k = | −3.5817E+00 | 3.2665E−01 | −1.7372E+00 | −4.1140E+00 | −3.6431E+00 |
| A4 = | 2.2954E−01 | 8.5629E−01 | 6.2278E−01 | −7.2931E−01 | −4.6825E−01 |
| A6 = | −4.3746E+00 | −3.0347E+00 | −4.2714E+00 | 7.8097E−01 | 2.8856E−01 |
| A8 = | 1.9882E+01 | 7.4471E+00 | 1.5599E+01 | −1.8398E+00 | −2.5760E−02 |
| A10 = | −4.7261E+01 | −5.8438E+00 | −3.6966E+01 | 3.5116E+00 | −1.4120E−01 |
| A12 = | 5.7542E+01 | −1.1151E+01 | 5.4407E+01 | −3.6643E+00 | 1.2941E−01 |
| A14 = | −2.7582E+01 | 2.5712E+01 | −4.1409E+01 | 1.9355E+00 | −5.1642E−02 |
| A16 = | | −1.4728E+01 | 1.2219E+01 | −4.0380E−01 | 8.0737E−03 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 1.67 | R6/R5 | 0.68 |
| Fno | 2.07 | R10/f | 0.27 |
| HFOV [deg.] | 46.6 | |f/f1| + |f/f2| + |f/f3| | 0.67 |
| V3 + V5 | 47.0 | |f/f4| + |f/f5| | 2.43 |
| (CT3 + CT5)/CT4 | 0.68 | SD11/SD52 | 0.62 |
| CT4/ΣCT | 0.38 | f/SD52 | 1.21 |
| T12/(T23 + T34 + T45) | 2.20 | ImgH/BL | 1.62 |
| SD/TD | 0.74 | | |

8th Embodiment

Figure 15:
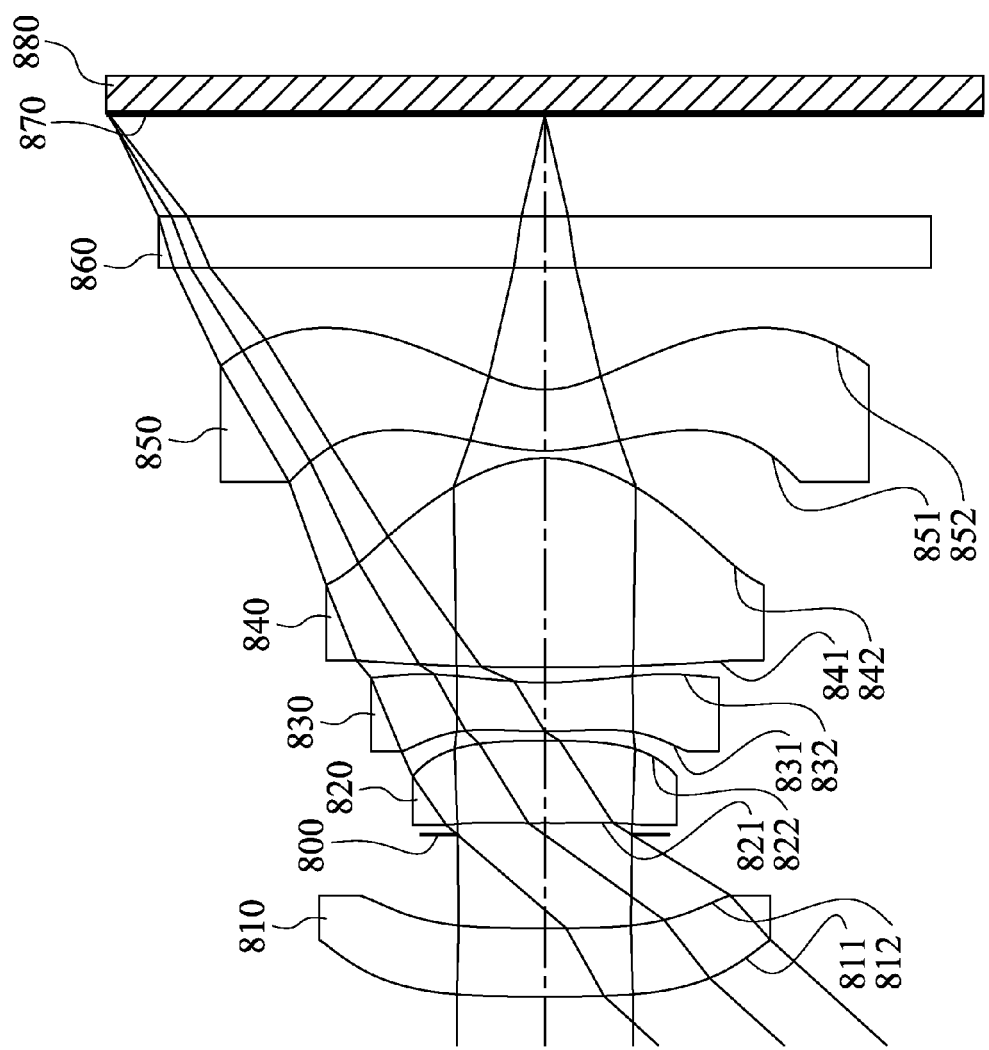
FIG. 15 is a schematic view of an image capturing device according to the 8th embodiment of the present disclosure.
Figure 16:
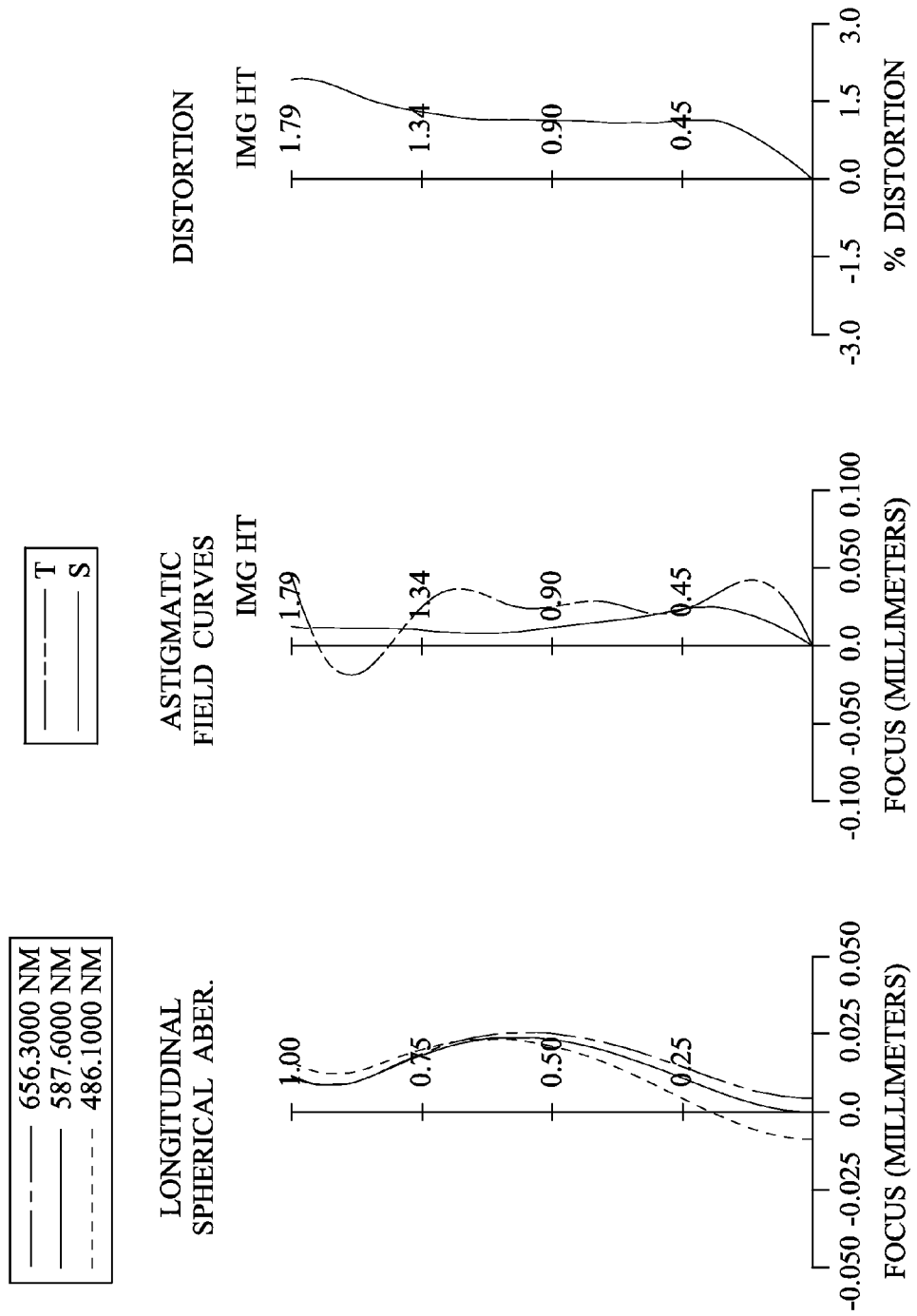
FIG. 16 shows spherical aberration curves, astigmatic field curves and a distortion curve of the image capturing device according to the 8th embodiment.

FIG. 15 is a schematic view of an image capturing device according to the 8th embodiment of the present disclosure. FIG. 16 shows spherical aberration curves, astigmatic field curves and a distortion curve of the image capturing device according to the 8th embodiment. In FIG. 15, the image capturing device includes a photographing lens system (its reference numeral is omitted) and an image sensor 880. The photographing lens system includes, in order from an object side to an image side, a first lens element 810, an aperture stop 800, a second lens element 820, a third lens element 830, a fourth lens element 840, a fifth lens element 850, an IR-cut filter 860 and an image surface 870, wherein the image sensor 880 is disposed on the image surface 870 of the photographing lens system. The photographing lens system has a total of five lens elements (810-850) with refractive power, and there is an air space in a paraxial region between any two of the first lens element 810, the second lens element 820, the third lens element 830, the fourth lens element 840, and the fifth lens element 850 that are adjacent to each other.

The first lens element 810 with negative refractive power has a convex object-side surface 811 and a concave image-side surface 812. The first lens element 810 is made of plastic material, and has the object-side surface 811 and the image-side surface 812 being both aspheric.

The second lens element 820 with positive refractive power has a convex object-side surface 821 and a convex image-side surface 822. The second lens element 820 is made of plastic material, and has the object-side surface 821 and the image-side surface 822 being both aspheric.

The third lens element 830 with negative refractive power has a convex object-side surface 831 and a concave image-side surface 832. The third lens element 830 is made of plastic material, and has the object-side surface 831 and the image-side surface 832 being both aspheric. Furthermore, the image-side surface 832 of the third lens element 830 has a convex shape in an off-axial region thereof.

The fourth lens element 840 with positive refractive power has a convex object-side surface 841 and a convex image-side surface 842. The fourth lens element 840 is made of plastic material, and has the object-side surface 841 and the image-side surface 842 being both aspheric.

The fifth lens element 850 with negative refractive power has a convex object-side surface 851 and a concave image-side surface 852. The fifth lens element 850 is made of plastic material, and has the object-side surface 851 and the image-side surface 852 being both aspheric. Furthermore, the image-side surface 852 of the fifth lens element 850 has a convex shape in an off-axial region thereof.

The IR-cut filter 860 is made of glass material and located between the fifth lens element 850 and the image surface 870, and will not affect a focal length of the photographing lens system.

The detailed optical data of the 8th embodiment are shown in Table 15 and the aspheric surface data are shown in Table 16 below.

TABLE 15

8th Embodiment
f = 1.59 mm, Fno = 2.20, HFOV = 47.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 23.304 | ASP | 0.280 | Plastic | 1.570 | 37.0 | −216.89 |
| 2 | | 19.522 | ASP | 0.383 | | | | |
| 3 | Ape. Stop | Plano | | 0.048 | | | | |
| 4 | Lens 2 | 22.568 | ASP | 0.337 | Plastic | 1.544 | 55.9 | 13.27 |
| 5 | | −10.563 | ASP | 0.039 | | | | |
| 6 | Lens 3 | 2.177 | ASP | 0.200 | Plastic | 1.633 | 23.4 | −12.63 |
| 7 | | 1.650 | ASP | 0.063 | | | | |
| 8 | Lens 4 | 97.912 | ASP | 0.857 | Plastic | 1.544 | 55.9 | 0.95 |
| 9 | | −0.516 | ASP | 0.030 | | | | |
| 10 | Lens 5 | 0.835 | ASP | 0.250 | Plastic | 1.633 | 23.4 | −1.49 |
| 11 | | 0.391 | ASP | 0.500 | | | | |
| 12 | IR-cut filter | Plano | | 0.210 | Glass | 1.517 | 64.2 | — |
| 13 | | Plano | | 0.422 | | | | |
| 14 | Image | Plano | | — | | | | |

Note:
Reference wavelength is 587.6 nm (d-line).

TABLE 16

Aspheric Coefficients

| Surface # | 1 | 2 | 4 | 5 | 6 |
|---|---|---|---|---|---|
| k = | −7.5559E+01 | −1.1374E+01 | −9.0000E+01 | −9.0000E+01 | 6.6634E+00 |
| A4 = | 3.8881E−01 | 5.2532E−01 | −7.3037E−02 | −2.0064E+00 | −2.6238E+00 |
| A6 = | −2.0241E−01 | 5.0834E−01 | −3.0287E+00 | 8.7407E+00 | 8.8377E+00 |
| A8 = | −1.4540E−01 | −7.1460E+00 | 1.8549E+01 | −5.3352E+01 | −4.5345E+01 |
| A10 = | 1.3344E+00 | 2.8565E+01 | −8.9968E+01 | 1.6433E+02 | 1.3105E+02 |
| A12 = | −2.7084E+00 | −5.2805E+01 | | −2.2602E+02 | −1.5898E+02 |
| A14 = | 2.9313E+00 | 4.2574E+01 | | | 7.0505E+01 |
| A16 = | −1.3856E+00 | −1.1811E+01 | | | |

| Surface # | 7 | 8 | 9 | 10 | 11 |
|---|---|---|---|---|---|
| k = | −2.4371E+01 | −9.0000E+01 | −1.9954E+00 | −1.2094E+01 | −3.7218E+00 |
| A4 = | −1.9032E−01 | 3.6189E−01 | 3.1306E−01 | 1.2517E−02 | −4.5320E−01 |
| A6 = | −1.6586E+00 | −1.8631E+00 | −2.6823E+00 | −1.8563E+00 | 4.0533E−01 |
| A8 = | 9.7925E+00 | 7.7586E+00 | 7.6673E+00 | 4.7948E+00 | −2.2523E−01 |
| A10 = | −3.0907E+01 | −2.1160E+01 | −1.2743E+01 | −6.6308E+00 | −3.6894E−02 |
| A12 = | 4.6718E+01 | 2.9501E+01 | 1.2421E+01 | 4.9182E+00 | 7.1779E−02 |
| A14 = | −2.4655E+01 | −1.5697E+01 | −5.1096E+00 | −1.8140E+00 | −3.3361E−02 |
| A16 = | | | 1.2446E−01 | 2.5983E−01 | 4.9345E−03 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 1.59 | R6/R5 | 0.76 |
| Fno | 2.20 | R10/f | 0.25 |
| HFOV [deg.] | 47.8 | |f/f1| + |f/f2| + |f/f3| | 0.25 |
| V3 + V5 | 46.8 | |f/f4| + |f/f5| | 2.74 |
| (CT3 + CT5)/CT4 | 0.53 | SD11/SD52 | 0.70 |
| CT4/ΣCT | 0.45 | f/SD52 | 1.20 |

-continued

| 8th Embodiment | | | |
|---|---|---|---|
| T12/(T23 + T34 + T45) | 3.27 | ImgH/BL | 1.58 |
| SD/TD | 0.73 | | |

9th Embodiment

Figure 17:
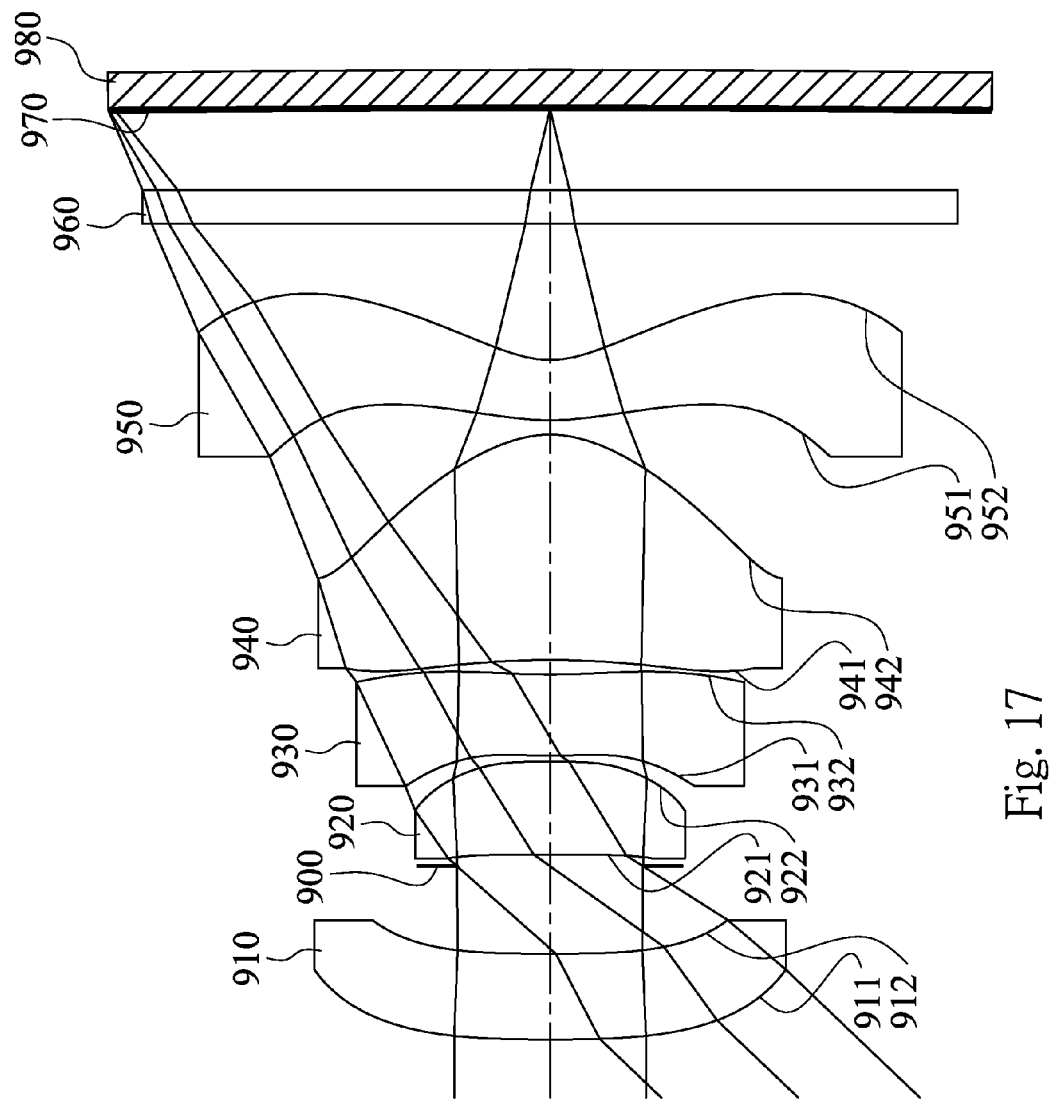
FIG. 17 is a schematic view of an image capturing device according to the 9th embodiment of the present disclosure.
Figure 18:
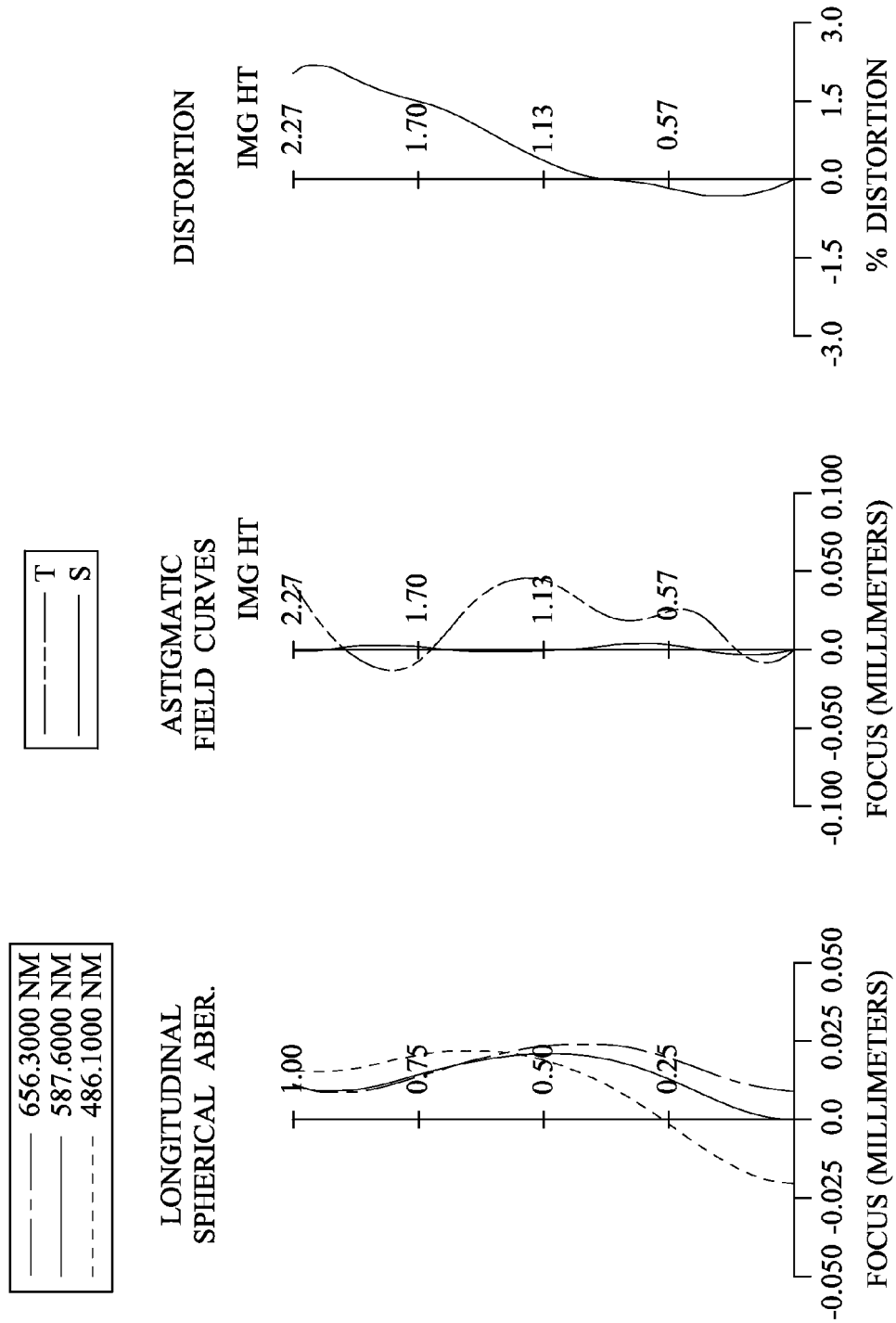
FIG. 18 shows spherical aberration curves, astigmatic field curves and a distortion curve of the image capturing device according to the 9th embodiment.

FIG. 17 is a schematic view of an image capturing device according to the 9th embodiment of the present disclosure. FIG. 18 shows spherical aberration curves, astigmatic field curves and a distortion curve of the image capturing device according to the 9th embodiment. In FIG. 17, the image capturing device includes a photographing lens system (its reference numeral is omitted) and an image sensor 980. The photographing lens system includes, in order from an object side to an image side, a first lens element 910, an aperture stop 900, a second lens element 920, a third lens element 930, a fourth lens element 940, a fifth lens element 950, an IR-cut filter 960 and an image surface 970, wherein the image sensor 980 is disposed on the image surface 970 of the photographing lens system. The photographing lens system has a total of five lens elements (910-950) with refractive power, and there is an air space in a paraxial region between any two of the first lens element 910, the second lens element 920, the third lens element 930, the fourth lens element 940, and the fifth lens element 950 that are adjacent to each other.

The first lens element 910 with positive refractive power has a convex object-side surface 911 and a concave image-side surface 912. The first lens element 910 is made of plastic material, and has the object-side surface 911 and the image-side surface 912 being both aspheric.

The second lens element 920 with negative refractive power has a concave object-side surface 921 and a convex image-side surface 922. The second lens element 920 is made of plastic material, and has the object-side surface 921 and the image-side surface 922 being both aspheric.

The third lens element 930 with positive refractive power has a convex object-side surface 931 and a concave image-side surface 932. The third lens element 930 is made of plastic material, and has the object-side surface 931 and the image-side surface 932 being both aspheric. Furthermore, the image-side surface 932 of the third lens element 930 has a convex shape in an off-axial region thereof.

The fourth lens element 940 with positive refractive power has a concave object-side surface 941 and a convex image-side surface 942. The fourth lens element 940 is made of plastic material, and has the object-side surface 941 and the image-side surface 942 being both aspheric.

The fifth lens element 950 with negative refractive power has a convex object-side surface 951 and a concave image-side surface 952. The fifth lens element 950 is made of plastic material, and has the object-side surface 951 and the image-side surface 952 being both aspheric. Furthermore, the image-side surface 952 of the fifth lens element 950 has a convex shape in an off-axial region thereof.

The IR-cut filter 960 is made of glass material and located between the fifth lens element 950 and the image surface 970, and will not affect a focal length of the photographing lens system.

The detailed optical data of the 9th embodiment are shown in Table 17 and the aspheric surface data are shown in Table 18 below.

TABLE 17

9th Embodiment
f = 2.12 mm, Fno = 2.15, HFOV = 46.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 9.854 | ASP | 0.442 | Plastic | 1.639 | 23.5 | 43.56 |
| 2 | | 14.987 | ASP | 0.451 | | | | |
| 3 | Ape. Stop | Plano | | 0.060 | | | | |
| 4 | Lens 2 | −28.886 | ASP | 0.478 | Plastic | 1.544 | 55.9 | −177.01 |
| 5 | | −41.500 | ASP | 0.030 | | | | |
| 6 | Lens 3 | 2.392 | ASP | 0.419 | Plastic | 1.639 | 23.5 | 8.29 |
| 7 | | 4.064 | ASP | 0.075 | | | | |
| 8 | Lens 4 | −4.251 | ASP | 1.160 | Plastic | 1.544 | 55.9 | 1.09 |
| 9 | | −0.572 | ASP | 0.074 | | | | |
| 10 | Lens 5 | 1.361 | ASP | 0.310 | Plastic | 1.639 | 23.5 | −1.37 |
| 11 | | 0.485 | ASP | 0.700 | | | | |
| 12 | IR-cut filter | Plano | | 0.175 | Glass | 1.517 | 64.2 | — |
| 13 | | Plano | | 0.423 | | | | |
| 14 | Image | −200.000 | | — | | | | |

Note:
Reference wavelength is 587.6 nm (d-line).

TABLE 18

| Aspheric Coefficients | | | | | |
|---|---|---|---|---|---|
| Surface # | 1 | 2 | 4 | 5 | 6 |
| k = | −1.0000E+00 | −2.8871E+01 | −3.3063E+01 | 5.0000E+01 | −6.6561E+01 |
| A4 = | 1.2912E−01 | 2.3923E−01 | −8.7322E−02 | −2.6886E+00 | −1.9160E+00 |
| A6 = | −4.7877E−02 | −1.7718E−01 | −2.7961E−01 | 9.0136E+00 | 4.6498E+00 |
| A8 = | 4.0942E−02 | 1.9303E−01 | 1.3835E+00 | −1.9549E+01 | −6.4659E+00 |
| A10 = | −9.1723E−03 | 5.8565E−02 | −6.8295E+00 | 2.3215E+01 | 3.8288E+00 |
| A12 = | −8.9965E−04 | −1.3972E−01 | | −1.4381E+01 | −2.2262E+00 |
| A14 = | 2.6915E−03 | 4.5797E−02 | | | 3.2980E+00 |
| Surface # | 7 | 8 | 9 | 10 | 11 |
| k = | 1.1974E+01 | −7.6550E+01 | −2.4305E+00 | −2.1860E+01 | −4.4814E+00 |
| A4 = | −2.4148E−01 | −2.3226E−02 | 3.0780E−02 | −7.2591E−02 | −1.9785E−01 |
| A6 = | −5.8156E−01 | −4.1066E−01 | −7.2879E−01 | −1.8415E−01 | 1.8682E−01 |
| A8 = | 2.3682E+00 | 1.6385E+00 | 1.5394E+00 | 4.3472E−01 | −1.2962E−01 |
| A10 = | −3.5671E+00 | −2.3810E+00 | −1.6084E+00 | −4.6549E−01 | 5.1982E−02 |
| A12 = | 2.4531E+00 | 1.6232E+00 | 8.5506E−01 | 2.4888E−01 | −1.2037E−02 |
| A14 = | −6.3835E−01 | −4.2683E−01 | −1.7403E−01 | −6.5704E−02 | 1.5261E−03 |
| A16 = | | | | 6.9194E−03 | −8.5126E−05 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 2.12 | R6/R5 | 1.70 |
| Fno | 2.15 | R10/f | 0.23 |
| HFOV [deg.] | 46.3 | $|f/f1| + |f/f2| + |f/f3|$ | 0.32 |
| V3 + V5 | 47.0 | $|f/f4| + |f/f5|$ | 3.49 |
| (CT3 + CT5)/CT4 | 0.63 | SD11/SD52 | 0.67 |
| CT4/ΣCT | 0.41 | f/SD52 | 1.17 |
| T12/(T23 + T34 + T45) | 2.85 | ImgH/BL | 1.75 |
| SD/TD | 0.74 | | |

10th Embodiment

Figure 19:
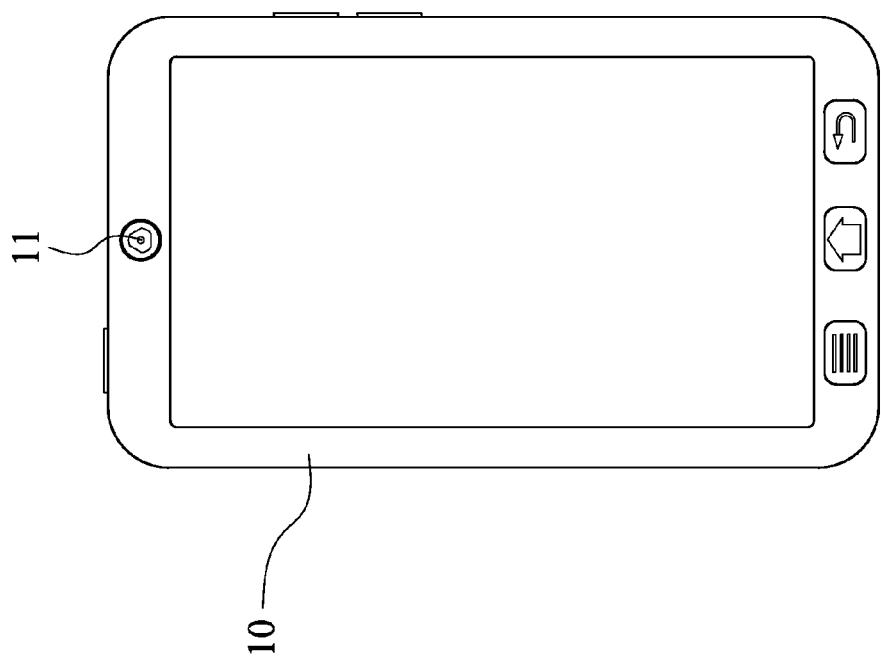
FIG. 19 is a schematic view of an electronic device according to the 10th embodiment of the present disclosure.

FIG. 19 is a schematic view of an electronic device 10 according to the 10th embodiment of the present disclosure. The electronic device 10 of the 9th embodiment is a smart phone, wherein the electronic device 10 includes an image capturing device 11. The image capturing device 11 includes a photographing lens system (its reference numeral is omitted) according to the present disclosure and an image sensor (its reference numeral is omitted), wherein the image sensor is disposed on an image surface of the photographing lens system.

11th Embodiment

Figure 20:
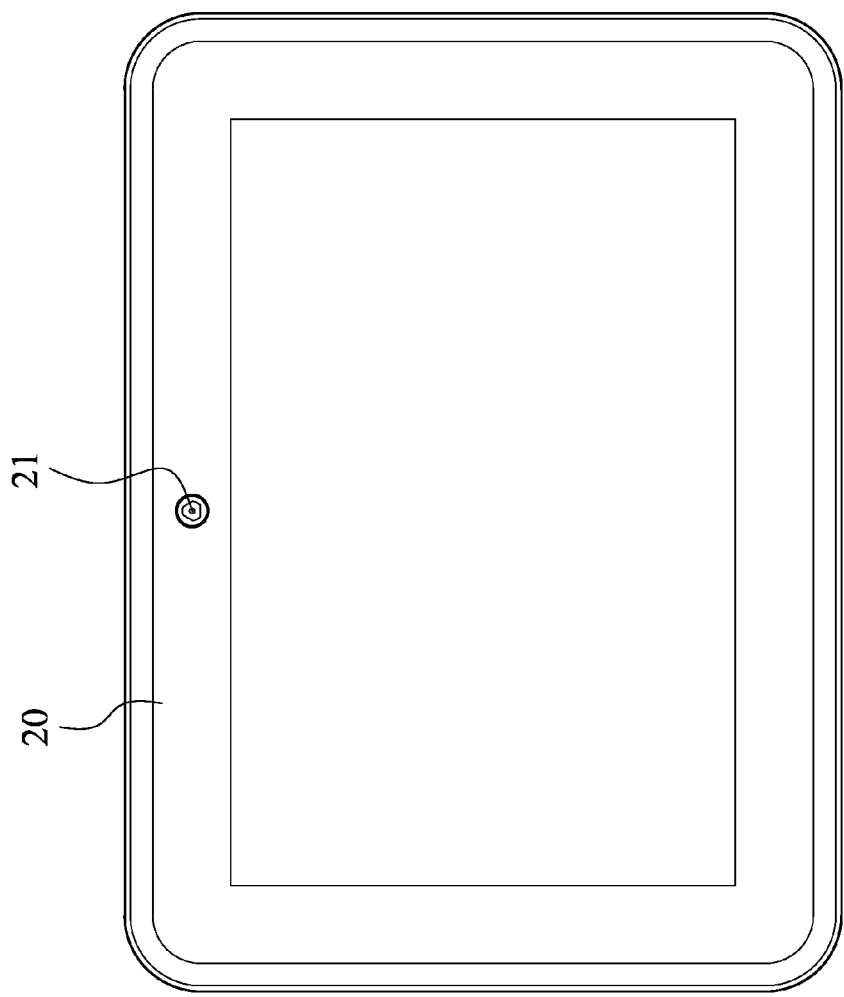
FIG. 20 is a schematic view of an electronic device according to the 11th embodiment of the present disclosure.

FIG. 20 is a schematic view of an electronic device 20 according to the 11th embodiment of the present disclosure. The electronic device 20 of the 11th embodiment is a tablet personal computer, wherein the electronic device 20 includes an image capturing device 21. The image capturing device 21 includes a photographing lens system (its reference numeral is omitted) according to the present disclosure and an image sensor (its reference numeral is omitted), wherein the image sensor is disposed on an image surface of the photographing lens system.

12th Embodiment

Figure 21:
FIG. 21 is a schematic view of an electronic device according to the 12th embodiment of the present disclosure.

FIG. 21 is a schematic view of an electronic device 30 according to the 12th embodiment of the present disclosure. The electronic device 30 of the 12th embodiment is a head-mounted display (HMD), wherein the electronic device 30 includes an image capturing device 31. The image capturing device 31 includes a photographing lens system (its reference numeral is omitted) according to the present disclosure and an image sensor (its reference numeral is omitted), wherein the image sensor is disposed on an image surface of the photographing lens system.

The foregoing description, for purpose of explanation, has been described with reference to specific embodiments. It is to be noted that TABLES 1-18 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing lens system comprising, in order from an object side to an image side:
    a first lens element having a convex object-side surface;
    a second lens element having a convex image-side surface;
    a third lens element having a convex object-side surface and a concave image-side surface;
    a fourth lens element having an object-side surface and an image-side surface being both aspheric; and
    a fifth lens element having a concave image-side surface, wherein an object-side surface and the image-side surface of the fifth lens element are aspheric, and the image-side surface of the fifth lens element has at least one convex shape in an off-axial region thereof;
    wherein the photographing lens system has a total of five lens elements, and there is an air space between any two lens elements of the first lens element, the second lens element, the third lens element, the fourth lens element and the fifth lens element that are adjacent to each other, the photographing lens system further comprises a stop, a curvature of the image-side surface of the second lens element is stronger than a curvature of an object-side surface of the second lens element, a focal length of the photographing lens system is f, a focal length of the first lens element is f1, a focal length of the second lens element is f2, a focal length of the third lens element is f3, a central thickness of the third lens element is CT3, a central thickness of the fourth lens element is CT4, a central thickness of the fifth lens element is CT5, a curvature radius of the object-side surface of the third lens element is R5, a curvature radius of the image-side surface of the third lens element is R6, an axial distance between the stop and the image-side surface of the fifth lens element is SD, an axial distance between the object-side surface of the first lens element and the image-side surface of the fifth lens element is TD, and the following conditions are satisfied:

$$|f/f1|+|f/f2|+|f/f3|<0.95;$$

$$(CT3+CT5)/CT4<0.85;$$

$$0.20<R6/R5;\text{ and}$$

$$0.65<SD/TD<1.0.$$

2. The photographing lens system of claim 1, wherein the object-side surface of the fifth lens element is convex.

3. The photographing lens system of claim 1, wherein the fourth lens element has positive refractive power, and the fifth lens element has negative refractive power.

4. The photographing lens system of claim 3, wherein the focal length of the photographing lens system is f, a focal length of the fourth lens element is f4, a focal length of the fifth lens element is f5, and the following condition is satisfied:

$$2.0<|f/f4|+|f/f5|<4.0.$$

5. The photographing lens system of claim 1, wherein the focal length of the photographing lens system is f, the focal length of the first lens element is f1, the focal length of the second lens element is f2, the focal length of the third lens element is f3, and the following condition is satisfied:

$$|f/f1|+|f/f2|+|f/f3|<0.80.$$

6. The photographing lens system of claim 1, wherein an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and the following condition is satisfied:

$$1.5<T12/(T23+T34+T45)<4.5.$$

7. The photographing lens system of claim 1, wherein the focal length of the photographing lens system is f, a maximum effective radius of the image-side surface of the fifth lens element is SD52, and the following condition is satisfied:

$$1.0<f/SD52<1.35.$$

8. The photographing lens system of claim 1, wherein an f-number of the photographing lens system is Fno, and the following condition is satisfied:

$$1.6<Fno<2.5.$$

9. The photographing lens system of claim 1, wherein the object-side surface and the image-side surface of the third lens element are both aspheric, and the image-side surface of the third lens element has at least one convex shape in an off-axial region thereof.

10. The photographing lens system of claim 1, wherein a maximum effective radius of the object-side surface of the first lens element is SD11, a maximum effective radius of the image-side surface of the fifth lens element is SD52, and the following condition is satisfied:

$$0.60<SD11/SD52<0.80.$$

11. The photographing lens system of claim 1, wherein the central thickness of the fourth lens element is CT4, a sum of central thicknesses of the first lens element, the second lens element, the third lens element, the fourth lens element and the fifth lens element is ΣCT, and the following condition is satisfied:

$$0.33<CT4/\Sigma CT<0.60.$$

12. The photographing lens system of claim 1, wherein an Abbe number of the third lens element is V3, an Abbe number of the fifth lens element is V5, and the following condition is satisfied:

$$25<V3+V5<55.$$

13. The photographing lens system of claim 1, wherein the third lens element has negative refractive power.

14. An image capturing device, comprising:
the photographing lens system of claim 1; and
an image sensor, wherein the image sensor is disposed on an image surface of the photographing lens system.

15. An electronic device, comprising:
the image capturing device of claim 14.

16. A photographing lens system comprising, in order from an object side to an image side:
a first lens element having a convex object-side surface;
a second lens element having a convex image-side surface;
a third lens element;
a fourth lens element having an object-side surface and an image-side surface being both aspheric; and
a fifth lens element having a concave image-side surface, wherein an object-side surface and the image-side surface of the fifth lens element are aspheric, and the image-side surface of the fifth lens element has at least one convex shape in an off-axial region thereof;
wherein the photographing lens system has a total of five lens elements, and there is an air space between any two lens elements of the first lens element, the second lens element, the third lens element, the fourth lens element and the fifth lens element that are adjacent to each other, the photographing lens system further comprises a stop, a focal length of the photographing lens system is f, a focal length of the first lens element is f1, a focal length of the second lens element is f2, a focal length of the third lens element is f3, an axial distance between the stop and the image-side surface of the fifth lens element is SD, an axial distance between the object-side surface of the first lens element and the image-side surface of the fifth lens element is TD, and the following conditions are satisfied:

$$|f/f1|+|f/f2|+|f/f3|<0.50; \text{ and}$$

$$0.65<SD/TD<1.0.$$

17. The photographing lens system of claim 16, wherein the third lens element has a concave image-side surface, an object-side surface and the image-side surface of the third lens element are both aspheric, and the image-side surface of the third lens element has at least one convex shape in an off-axial region thereof.

18. The photographing lens system of claim 16, wherein a maximum effective radius of the object-side surface of the first lens element is SD11, a maximum effective radius of the image-side surface of the fifth lens element is SD52, and the following condition is satisfied:

$$0.60<SD11/SD52<0.80.$$

19. The photographing lens system of claim 16, wherein an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and the following condition is satisfied:

$$1.5<T12/(T23+T34+T45)<4.5.$$

20. The photographing lens system of claim 16, wherein the central thickness of the fourth lens element is CT4, a sum of central thicknesses of the first lens element, the second lens element, the third lens element, the fourth lens element and the fifth lens element is ΣCT, and the following condition is satisfied:

$$0.33<CT4/\Sigma CT<0.60.$$

21. The photographing lens system of claim 16, wherein an Abbe number of the third lens element is V3, an Abbe number of the fifth lens element is V5, and the following condition is satisfied:

$$25<V3+V5<55.$$

22. The photographing lens system of claim 16, wherein a maximum image height of the photographing lens system is ImgH, an axial distance between the image-side surface of the fifth lens element and an image surface is BL, and the following condition is satisfied:

$$1.3<ImgH/BL<2.5.$$

23. The photographing lens system of claim 16, wherein the focal length of the photographing lens system is f, a curvature radius of the image-side surface of the fifth lens element is R10, and the following condition is satisfied:

$$0 < R10/f < 0.40.$$

24. The photographing lens system of claim 16, wherein the focal length of the photographing lens system is f, a maximum effective radius of the image-side surface of the fifth lens element is SD52, and the following condition is satisfied:

$$1.0 < f/SD52 < 1.35.$$

25. An image capturing device, comprising:
the photographing lens system of claim 16; and
an image sensor, wherein the image sensor is disposed on an image surface of the photographing lens system.

26. An electronic device, comprising:
the image capturing device of claim 25.

* * * * *